(12) United States Patent
Ohtake

(10) Patent No.: US 7,920,333 B2
(45) Date of Patent: Apr. 5, 2011

(54) VARIABLE FOCAL DISTANCE LENS SYSTEM AND IMAGING DEVICE

(75) Inventor: Motoyuki Ohtake, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/654,930

(22) Filed: Jan. 8, 2010

(65) Prior Publication Data

US 2010/0220399 A1     Sep. 2, 2010

(30) Foreign Application Priority Data

Feb. 27, 2009  (JP) ................................ 2009-046325

(51) Int. Cl.
*G02B 15/14* (2006.01)
(52) U.S. Cl. ...................................................... 359/687
(58) Field of Classification Search .................. 359/687
See application file for complete search history.

(56) References Cited

FOREIGN PATENT DOCUMENTS

| EP | 1528420 A2 * | 5/2005 |
|---|---|---|
| JP | 2007-072117 | 3/2007 |
| JP | 2007-094174 | 4/2007 |
| JP | 2008-046208 | 2/2008 |
| JP | 2008-102165 | 5/2008 |
| JP | 2008-146016 | 6/2008 |
| JP | 2008-203453 | 9/2008 |

\* cited by examiner

*Primary Examiner* — William C Choi
(74) *Attorney, Agent, or Firm* — Rader, Fishman & Grauer PLLC

(57) ABSTRACT

A variable focal distance lens system includes a first lens group having positive refractive power, a second lens group having negative refractive power, a third lens group having positive refractive power, and a fourth lens group having positive refractive power, which are sequentially disposed from an object side to an image side. The system satisfies $-0.65 < (R33-R34)/(R33+R34) < -0.25$ and $-1.0 < (R22-R23)/(R22+R23) < -0.6$, wherein R33 represents the radius of curvature of the most image-side surface of a cemented lens of the third lens group, R34 represents the radius of curvature of the object-side surface of a positive lens of the third lens group disposed on the most image side, R22 represents the radius of curvature of the image-side surface of a negative lens of the second lens group disposed on the most object side, and R23 represents the radius of curvature of the most object-side surface of a cemented lens of the second lens group.

15 Claims, 14 Drawing Sheets

VARIABLE FOCAL DISTANCE LENS SYSTEM AND IMAGING DEVICE

BACKGROUND OF THE INVENTION

1. Field of the Invention

The present invention relates to a variable focal distance lens system and an imaging device. More in detail, the present invention particularly relates to a technical field of a variable focal distance lens system and an imaging device used in a video camera, a digital still camera, and so forth, and having an angle of view exceeding seventy-five degrees in a wide-angle end state and a zoom ratio exceeding ten times.

2. Description of the Related Art

In the past, a method has been used which employs, as recording means in a camera, an image pickup device using photoelectric conversion elements such as CCDs (Charge Coupled Devices) and CMOSs (Complementary Metal-Oxide Semiconductors) to record a subject image formed on a surface of the image pickup device by converting the light amount of the subject image into an electrical output with the use of the photoelectric conversion elements.

Along with the advancement of microfabrication technology in recent years, the speed of central processing units (CPUs) and the integration density of storage media have been increased. As a result, a large volume of image data unable to be handled in the past has started to be processed at high speed. Further, light-receiving elements have also been increased in integration density and reduced in size. The increase in integration density has enabled higher spatial frequencies to be recorded, and the reduction in size has enabled the entire camera to be reduced in size.

However, there is an issue in that the above-described increase in integration density and the reduction in size result in a reduction of the light-receiving area of the individual photoelectric conversion elements, and that the resultant decrease in the electrical output is accompanied by an increase in the influence of noise. In view of this, to reduce such influence of noise, there is a configuration in which the aperture ratio of an optical system is increased to increase the amount of light reaching light-receiving elements. Further, there is also a configuration in which minute lens elements called micro-lens arrays are disposed immediately before the respective elements.

The micro-lens arrays guide light fluxes reaching between adjacent elements onto the elements, but limit the exit pupil position of a lens system. This is because the closer to the light-receiving elements the exit pupil position of the lens system is, the larger angle is formed between a principal ray reaching the light-receiving elements and the optical axis, and thus an off-axis light flux directed to a screen peripheral area forms a large angle with respect to the optical axis, to thereby prevent a desired amount of light from reaching the light-receiving elements and cause a shortage of the light amount.

In recent years, along with the spread of digital cameras, users' requirements have become diverse.

Particularly, a camera small in size but including a zoom lens having a high magnification ratio (a variable focal distance lens system) is desired, and zoom lenses having a magnification ratio exceeding ten times are provided.

In general, a positive-negative-positive-positive four-group type has been used as a type representing the configuration of a zoom lens having a high magnification ratio.

The positive-negative-positive-positive four-group type zoom lens is configured to include a first lens group having positive refractive power, a second lens group having negative refractive power, a third lens group having positive refractive power, and a fourth lens group having positive refractive power, which are sequentially disposed from the object side to the image side. In the positive-negative-positive-positive four-group type zoom lens, during a change in positional state of lenses from a wide-angle end state with the shortest focal distance to a telescopic end state with the longest focal distance, each of the first to third lens groups moves such that the interval between the first and second lens groups is increased and the interval between the second and third lens groups is reduced, and the fluctuation of the image plane position is compensated for by the movement of the fourth lens group.

As such a positive-negative-positive-positive four-group type zoom lens, the zoom lens described in Japanese Unexamined Patent Application Publication No. 2008-146016, for example, is used.

Further, in recent years, wide-angle zoom lenses having an angle of view exceeding seventy-five degrees have increased. As one of such wide-angle zoom lenses, a so-called negative-lead zoom lens including a first lens group having negative refractive power has been often used in the past.

For example, the zoom lens described in Japanese Unexamined Patent Application Publication No. 2007-94174 is configured to include a first lens group having negative refractive power and a second lens group having positive refractive power, which are sequentially disposed from the object side to the image side.

Further, the zoom lens described in Japanese Unexamined Patent Application Publication No. 2008-46208 is configured to include a first lens group having negative refractive power, a second lens group having positive refractive power, a third lens group having negative refractive power, and a fourth lens group having positive refractive power, which are sequentially disposed from the object side to the image side.

Further, in recent years, aspherical lenses have been commonly used, and a so-called positive-lead zoom lens including a first lens group having positive refractive power has also been often used.

Such a positive-lead zoom lens includes the zoom lenses described in Japanese Unexamined Patent Application Publication Nos. 2008-102165, 2007-72117, and 2008-203453, and so forth.

For example, in the positive-lead zoom lens described in Japanese Unexamined Patent Application Publication No. 2008-102165, many aspherical lenses are used to achieve a wide angle and a high magnification, and the third lens group is configured to include a positive lens having two convex surfaces, and a meniscus-shaped negative lens having a concave surface facing the image side, which are sequentially disposed from the object side to the image side.

In the zoom lens described in Japanese Unexamined Patent Application Publication No. 2007-72117, the third lens group is configured to include a cemented lens formed by a positive lens having a convex surface facing the object side and a negative lens having a concave surface facing the image side, and a positive lens, which are sequentially disposed from the object side to the image side.

In the zoom lens described in Japanese Unexamined Patent Application Publication No. 2008-203453, the third lens group is configured to include a positive lens having two convex surfaces, and a cemented lens having negative refractive power and formed by a positive lens having a convex surface facing the object side and a negative lens having a concave surface facing the image side, which are sequentially disposed from the object side to the image side.

SUMMARY OF THE INVENTION

In the negative-lead zoom lens, however, in an attempt to achieve both an angle of view exceeding seventy-five degrees and a high magnification of approximately ten times, the light flux temporarily spreads in the telescopic end state, and thus the diameter of the light flux passing through the lens groups subsequent to the second lens group is increased. Thus, it is desirable to more favorably correct a spherical aberration. Therefore, there is an issue in that it is difficult to sufficiently reduce the entire lens length and the lens diameter.

Further, in the existing positive-lead zoom lens, the off-axis light flux emitted from the second lens group is intensively diffused to achieve a wide angle in the wide-angle end state while ensuring a reduction in size.

Therefore, the third lens group is configured to have strong refractive power. However, the configuration in which the third lens group is formed by a positive lens and a negative lens, as in the zoom lenses described in Japanese Unexamined Patent Application Publication Nos. 2008-102165 and 2008-203453, has an issue in that the optical performance is considerably deteriorated due to mutual eccentricity of these lenses.

Further, in the third lens group of the zoom lens described in Japanese Unexamined Patent Application Publication No. 2007-72117, the radius of curvature of the image-side surface of the cemented lens and the radius of curvature of the object-side surface of the positive lens are mutually close values. Therefore, there is an issue in that it is difficult to favorably correct a spherical aberration.

In view of the above, in a variable focal distance lens system and an imaging device according to an embodiment of the present invention, it is desirable to address the above-described issues and achieve a high magnification and a wide angle while ensuring a reduction in size.

In view of the above-described issues, a variable focal distance lens system according to an embodiment of the present invention includes a first lens group having positive refractive power, a second lens group having negative refractive power, a third lens group having positive refractive power, and a fourth lens group having positive refractive power, which are sequentially disposed from an object side to an image side. During a change in positional state of lenses from a wide-angle end state to a telescopic end state, the interval between the first and second lens groups is increased, the interval between the second and third lens groups is reduced, and the interval between the third and fourth lens groups is changed. During the change in positional state of the lenses from the wide-angle end state to the telescopic end state, all lens groups are movable. The second lens group is configured to include a negative lens having a concave surface facing the image side, and a cemented lens formed by a negative lens having a concave surface facing the image side and a meniscus-shaped positive lens having a convex surface facing the object side, which are sequentially disposed from the object side to the image side. The third lens group is configured to include a cemented lens formed by a positive lens having a convex surface facing the object side and a negative lens having a concave surface facing the image side, and a positive lens having two convex surfaces, which are sequentially disposed from the object side to the image side. In the second lens group, each of two surfaces of the negative lens disposed on the object side and the most image-side surface of the cemented lens is formed into an aspherical surface. The variable focal distance lens system satisfies the following conditional expressions (1) and (2): (1) $-0.65 < (R33-R34)/(R33+R34) < -0.25$ and (2) $-1.0 < (R22-R23)/(R22+R23) < -0.6$, wherein R33 represents the radius of curvature of the most image-side surface of the cemented lens of the third lens group, R34 represents the radius of curvature of the object-side surface of the positive lens of the third lens group disposed on the most image side, R22 represents the radius of curvature of the image-side surface of the negative lens of the second lens group disposed on the most object side, and R23 represents the radius of curvature of the most object-side surface of the cemented lens of the second lens group.

Particularly, therefore, a negative spherical aberration and a positive curvature of field occurring in the wide-angle end state are favorably corrected. Therefore, it is possible to achieve a high magnification and a wide angle while ensuring a reduction in size.

It is desirable to configure the above-described variable focal distance lens system to satisfy the following conditional expression (3): $1.6 < f34w/fw < 2.1$, wherein f34w represents the combined focal distance of the third and fourth lens groups in the wide-angle end state, and fw represents the focal distance of the entire lens system in the wide-angle end state.

With the variable focal distance lens system satisfying the conditional expression (3), a principal ray incident on the third lens group forms a small angle with respect to the optical axis. Therefore, it is possible to reduce the entire lens length and the lens diameter of the first lens group.

It is desirable to configure the above-described variable focal distance lens system to satisfy the following conditional expression (4): $2.3 < f1/(fw \cdot ft)^{1/2} < 2.7$, wherein f1 represents the focal distance of the first lens group, and ft represents the focal distance of the entire lens system in the telescopic end state.

With the variable focal distance lens system satisfying the conditional expression (4), the entire length of the first lens group in the telescopic end state is reduced, and a negative spherical aberration caused by the first lens group is favorably corrected.

It is desirable to configure the above-described variable focal distance lens system to satisfy the following conditional expression (5): $1.0 < \Sigma 2/fw < 1.3$, wherein $\Sigma 2$ represents the thickness of the second lens group along the optical axis, and fw represents the focal distance of the entire lens system in the wide-angle end state.

With the variable focal distance lens system satisfying the conditional expression (5), a change in refractive power based on the position in the surfaces of the lenses is suppressed, and an off-axis light flux incident on the first lens group moves toward the optical axis. Accordingly, it is possible to improve the optical performance, and to achieve a reduction in size.

It is desirable to configure the above-described variable focal distance lens system to satisfy the following conditional expression (6): $0.25 < R22/D2w < 0.35$, wherein D2w represents the distance from an aperture stop to the image-side surface of the negative lens of the second lens group disposed on the most object side in the wide-angle end state.

With the variable focal distance lens system satisfying the conditional expression (6), the occurrence of a curvature of field in the negative lens of the second lens group is suppressed, and the off-axis light flux incident on the second lens group forms a small angle with respect to the optical axis. Accordingly, it is possible to improve the optical performance.

It is desirable to configure the above-described variable focal distance lens system such that the aperture stop is disposed on the object side of the third lens group, and moves integrally with the third lens group during the change in positional state of the lenses, and to configure the variable focal distance lens system to satisfy the following conditional expression (7): $0.06 < dS3/R31 < 0.10$, wherein dS3 represents the distance along the optical axis between the aperture stop and the most object-side surface of the third lens group, and R31 represents the radius of curvature of the most object-side surface of the third lens group.

With the variable focal distance lens system configured as described above and satisfying the conditional expression (7), a negative spherical aberration occurring in the third lens group is favorably corrected, and the entire length of the lens system in the telescopic end state is reduced.

It is desirable to configure the above-described variable focal distance lens system to satisfy the following conditional expression (8): 2<f3/fw<2.3, wherein f3 represents the focal distance of the third lens group.

With the variable focal distance lens system satisfying the conditional expression (8), the fluctuation of a coma aberration accompanying the change in the angle of view in the wide-angle end state is favorably corrected, and the entire length of the lens system is reduced irrespective of the positional state of the lenses.

It is desirable to configure the above-described variable focal distance lens system to satisfy the following conditional expression (9): −1<1/β2t<−0.8, wherein β2t represents the lateral magnification of the second lens group in the telescopic end state.

With the variable focal distance lens system satisfying the conditional expression (9), a positive spherical aberration occurring in the second lens group is favorably and sufficiently corrected, and the entire length of the lens system in the telescopic end state is reduced.

In view of the above-described issues, an imaging device according to an embodiment of the present invention includes a variable focal distance lens system and an image pickup device which converts an optical image formed by the variable focal distance lens system into an electrical signal. The variable focal distance lens system includes a first lens group having positive refractive power, a second lens group having negative refractive power, a third lens group having positive refractive power, and a fourth lens group having positive refractive power, which are sequentially disposed from an object side to an image side. During a change in positional state of lenses from a wide-angle end state to a telescopic end state, the interval between the first and second lens groups is increased, the interval between the second and third lens groups is reduced, and the interval between the third and fourth lens groups is changed. During the change in positional state of the lenses from the wide-angle end state to the telescopic end state, all lens groups are movable. The second lens group is configured to include a negative lens having a concave surface facing the image side, and a cemented lens formed by a negative lens having a concave surface facing the image side and a meniscus-shaped positive lens having a convex surface facing the object side, which are sequentially disposed from the object side to the image side. The third lens group is configured to include a cemented lens formed by a positive lens having a convex surface facing the object side and a negative lens having a concave surface facing the image side, and a positive lens having two convex surfaces, which are sequentially disposed from the object side to the image side. In the second lens group, each of two surfaces of the negative lens disposed on the object side and the most image-side surface of the cemented lens is formed into an aspherical surface. The variable focal distance lens system satisfies the following conditional expressions (1) and (2): (1) −0.65<(R33−R34)/(R33+R34)<−0.25 and (2) −1.0<(R22−R23)/(R22+R23)<−0.6, wherein R33 represents the radius of curvature of the most image-side surface of the cemented lens of the third lens group, R34 represents the radius of curvature of the object-side surface of the positive lens of the third lens group disposed on the most image side, R22 represents the radius of curvature of the image-side surface of the negative lens of the second lens group disposed on the most object side, and R23 represents the radius of curvature of the most object-side surface of the cemented lens of the second lens group.

Particularly, therefore, a negative spherical aberration and a positive curvature of field occurring in the wide-angle end state are favorably corrected. Accordingly, it is possible to achieve a high magnification and a wide angle while ensuring a reduction in size.

DESCRIPTION OF THE PREFERRED EMBODIMENTS

Figure 1:
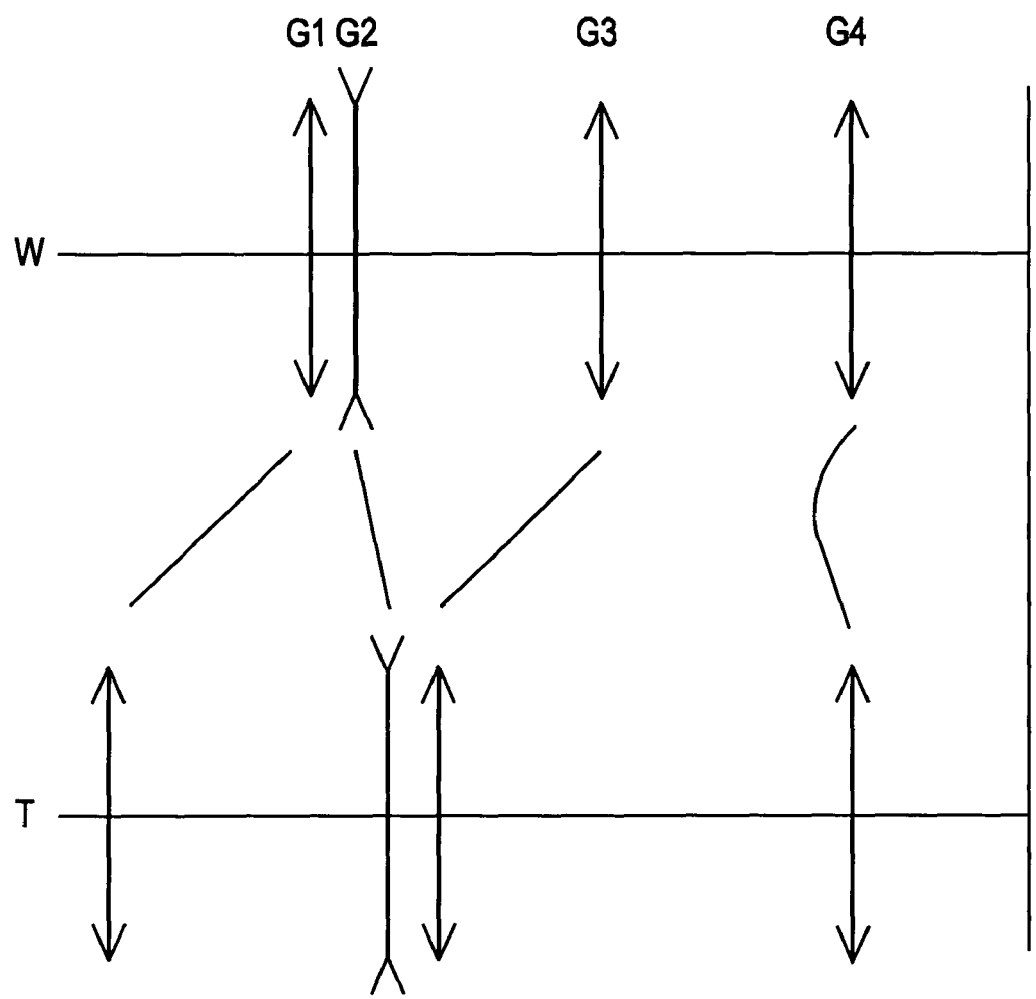
FIG. 1 is a diagram illustrating, together with FIGS. 2 to 14, a preferred embodiment for implementing an imaging device and a variable focal distance lens system according to an embodiment of the present invention, and illustrating refractive power distribution of the variable focal distance lens system.

Preferred embodiments for implementing a variable focal distance lens system and an imaging device according to an embodiment of the present invention will be described below.

Configuration of Variable Focal Distance Lens System: A variable focal distance lens system according to an embodiment of the present invention will be first described.

A variable focal distance lens system according to an embodiment of the present invention is configured to include a first lens group having positive refractive power, a second lens group having negative refractive power, a third lens group having positive refractive power, and a fourth lens group having positive refractive power, which are sequentially disposed from the object side to the image side.

Further, in the variable focal distance lens system according to an embodiment of the present invention, during a change in positional state of lenses from a wide-angle end state to a telescopic end state, the interval between the first and second lens groups is increased, the interval between the second and third lens groups is reduced, and the interval between the third and fourth lens groups is changed. Further, during the change in positional state of the lenses from the wide-angle end state to the telescopic end state, all lens groups are movable.

Further, in the variable focal distance lens system according to an embodiment of the present invention, the second lens group is configured to include a negative lens having a concave surface facing the image side, and a cemented lens formed by a negative lens having a concave surface facing the image side and a meniscus-shaped positive lens having a convex surface facing the object side, which are sequentially disposed from the object side to the image side.

Furthermore, in the variable focal distance lens system according to an embodiment of the present invention, the third lens group is configured to include a cemented lens formed by a positive lens having a convex surface facing the object side and a negative lens having a concave surface facing the image side, and a positive lens having two convex surfaces, which are sequentially disposed from the object side to the image side.

In addition, in the variable focal distance lens system according to an embodiment of the present invention, in the second lens group, each of two surfaces of the negative lens disposed on the object side and the most image-side surface of the cemented lens is formed into an aspherical surface.

Functions of the respective lens groups forming the variable focal distance lens system according to an embodiment of the present invention will be described below.

The variable focal distance lens system according to an embodiment of the present invention is configured such that the first and second lens groups are disposed in proximity with each other in the wide-angle end state to make an off-axis light flux incident on the first lens group move toward the optical axis. Therefore, the lens diameter can be reduced. At the same time, the interval between the first and second lens groups is increased during the change in positional state of the lenses from the wide-angle end state to the telescopic end state, to thereby make the off-axis light flux passing through the first lens group move away from the optical axis.

The variable focal distance lens system according to an embodiment of the present invention uses a change in height of the above-described off-axis light flux to favorably correct the fluctuation of an off-axis aberration accompanying the change in positional state of the lenses.

Also, the interval between the second and third lens groups is increased in the wide-angle end state to make the off-axis light flux passing through the second lens group move away from the optical axis. It is therefore possible to correct an axial aberration and an off-axis aberration separately.

Further, during the change in positional state of the lenses from the wide-angle end state to the telescopic end state, the interval between the second and third lens groups is reduced to make the off-axis light flux passing through the second lens group move toward the optical axis. It is therefore possible to favorably correct the fluctuation of an off-axis aberration accompanying the change in positional state of the lenses, and thus to achieve high performance.

In the variable focal distance lens system configured to include four lens groups as described above, an attempt to increase the angle of view in the wide-angle end state and achieve a reduction in size and high performance involves the following two issues (A) and (B): (A) an increase in the fluctuation of the off-axis aberration accompanying the change in the angle of view in the wide-angle end state, and (B) an increase in the deterioration of the performance due to eccentricity of lenses occurring in the manufacturing process.

The issue (A) will be first described.

In general, in an attempt to increase the angle of view in the wide-angle end state, the off-axis light flux incident on the first lens group moves away from the optical axis, and thus the lens diameter is increased. Particularly, in a case in which the first lens group has positive refractive power, when an attempt is made to increase the angle of view by using related art, the light flux emitted from the first lens group forms a substantially large angle with respect to the optical axis. As a result, the fluctuation of the off-axis aberration based on the angle of view is increased.

In view of the above, the variable focal distance lens system according to an embodiment of the present invention focuses on the fact that, if the off-axis light flux incident on the first lens group is moved toward the optical axis, the fluctuation of the off-axis aberration accompanying the change in the angle of view can be suppressed. Specifically, the thickness of the second lens group is reduced, as described below, to suppress the fluctuation of the off-axis aberration accompanying the change in the angle of view.

To reduce the thickness of the second lens group, the second lens group is configured to include a negative lens having a concave surface facing the image side, and a cemented lens formed by a negative lens having a concave surface facing the image side and a meniscus-shaped positive lens having a convex surface facing the object side, which are sequentially disposed from the object side to the image side.

As an existing configuration, there is a configuration in which a second lens group includes a meniscus-shaped negative lens having a concave surface facing the image side, and a cemented negative lens formed by a negative lens having two concave surfaces and a meniscus-shaped positive lens having a convex surface facing the object side, which are sequentially disposed from the object side to the image side, as described in Japanese Unexamined Patent Application Publication No. 2007-292994, for example.

In such a configuration, however, the most object-side surface of the cemented lens is a concave surface facing the object side. Therefore, the interval between the negative lens and the cemented lens is desired to be increased.

In the variable focal distance lens system according to an embodiment of the present invention, therefore, the negative lens of the second lens group disposed on the object side is formed into an aspherical lens, to thereby reduce the aberration correction function of the most object-side surface of the cemented lens and form the cemented lens into a shape having a convex surface facing the object side. Thereby, a reduction in thickness is achieved.

Further, as another existing configuration, there is a configuration in which three lenses including a meniscus-shaped negative lens having a concave surface facing the image side, a negative lens having two concave surfaces, and a positive lens having a convex surface facing the object side are sequentially disposed from the object side to the image side, as described in Japanese Unexamined Patent Application Publication No. 2008-191291, for example.

In such a configuration, however, the second lens group does not include a cemented lens. Therefore, the thickness of the second lens group is increased.

In view of the above, in the variable focal distance lens system according to an embodiment of the present invention, the most image-side surface of the second lens group is formed into an aspherical surface, to thereby favorably correct a negative spherical aberration occurring when two lenses located on the image side are formed into a cemented lens, and form the cemented lens suppressing the aberration. In the present invention, therefore, the interval between the two lenses located on the image side, i.e., the negative lens and the positive lens is removed to achieve a reduction in thickness.

Further, the variable focal distance lens system according to an embodiment of the present invention also focuses on the structure of the third lens group, as described below.

As an existing configuration, there is a configuration in which the third lens group includes a positive lens having two convex surfaces, and a cemented negative lens formed by a positive lens having a convex surface facing the object side and a negative lens having a concave surface facing the image side, which are sequentially disposed from the object side to the image side, as described in Japanese Unexamined Patent Application Publication No. 2008-203453, for example.

In such a configuration, however, a principal ray is converged by the positive lens of the third lens group disposed on the object side, and thereafter is diffused by the cemented lens. Therefore, the principal ray incident on the third lens group (emitted from the second lens group) forms a large angle with respect to the optical axis. Due to the large angle of the principal ray with respect to the optical axis, therefore, the off-axis light flux incident on the first lens group moves away from the optical axis.

In the variable focal distance lens system according to an embodiment of the present invention, therefore, the third lens group is configured to include a cemented lens formed by a positive lens having a convex surface facing the object side and a negative lens having a concave surface facing the image side, and a positive lens having two convex surfaces, which are sequentially disposed from the object side to the image side, to thereby change the refractive power structure of the third lens group in the existing configuration.

Therefore, the principal ray incident on the third lens group (emitted from the second lens group) forms a small angle with respect to the optical axis, and the off-axis light flux incident on the first lens group is moved toward the optical axis. Accordingly, a reduction in lens diameter is achieved.

Subsequently, the issue (B) will be described.

As an existing configuration, there is configuration in which the third lens group has strong positive refractive power, but includes a positive lens having positive refractive power and a cemented lens having negative refractive power, as described in the above-described Japanese Unexamined Patent Application Publication No. 2008-203453, for example.

In such a configuration, however, the optical performance is substantially deteriorated due to mutual eccentricity of the positive lens and the cemented lens.

In the present invention, therefore, the cemented lens and the positive lens of the third lens group are configured to be contactable with each other. Thus, with the cemented lens and the positive lens brought into contact with each other, it is unnecessary to hold the cemented lens and the positive lens with another member interposed therebetween. Accordingly, it is possible to reduce the mutual eccentricity occurring in the manufacturing process, and thus to ensure stable optical quality in the manufacturing process.

Further, there is another existing configuration in which the second lens group is formed by a negative lens and a cemented lens having a concave surface as the most object-side surface, and in which a flat portion is formed on the outer circumference of the effective diameter of the image-side surface of the negative lens to make the negative lens and the cemented lens contactable with each other.

In such a configuration, however, the object-side surface of the cemented lens is a concave surface. Therefore, it is desirable to form a flat portion also to the outer circumference of the effective diameter of the object-side surface of the cemented lens, to thereby bring the flat portion of the image-side surface of the negative lens and the flat portion of the object-side surface of the cemented lens into contact with each other. Therefore, with the flat portion of the negative lens and the flat portion of the cemented lens brought into contact with each other, the cemented lens may incline due to the flat portions.

In the variable focal distance lens system according to an embodiment of the present invention, therefore, the object-side surface of the cemented lens is formed into a convex surface. Thereby, it is possible to bring the negative lens and the cemented lens into contact with each other, without forming a flat portion on the outer circumference of the effective diameter of the object-side surface of the cemented lens. Therefore, the inclination of the cemented lens due to the flat portions is prevented in the manufacturing process. Accordingly, it is possible to reduce the mutual eccentricity occurring in the manufacturing process, and thus to achieve stable optical quality in the manufacturing process.

With the configuration as described above, the present invention is capable of achieving a high magnification and a wide angle while ensuring a reduction in size.

The variable focal distance lens system according to an embodiment of the present invention is configured to satisfy the following conditional expressions (1) and (2): (1) $-0.65<(R33-R34)/(R33+R34)<-0.25$ and (2) $-1.0<(R22-R23)/(R22+R23)<-0.6$, wherein R33 represents the radius of curvature of the most image-side surface of the cemented lens of the third lens group, R34 represents the radius of curvature of the object-side surface of the positive lens of the third lens group disposed on the most image side, R22 represents the radius of curvature of the image-side surface of the negative lens of the second lens group disposed on the most object side, and R23 represents the radius of curvature of the most object-side surface of the cemented lens of the second lens group.

The conditional expression (1) is an expression specifying the shape of the interval formed between the cemented lens of the third lens group and the positive lens disposed on the image side of the cemented lens.

If a value over the upper limit value of the conditional expression (1) is obtained, the radius of curvature of the most image-side surface of the cemented lens and the radius of curvature of the object-side surface of the positive lens are close to each other, and the aberration correction function of the two surfaces is reduced. Accordingly, the negative spherical aberration is not favorably corrected, and favorable optical performance is not obtained.

Meanwhile, if a value below the lower limit value of the conditional expression (1) is obtained, a positive curvature of field occurring in the wide-angle end state is not favorably corrected, and favorable imaging performance is not obtained.

Therefore, with the variable focal distance lens system satisfying the conditional expression (1), it is possible to favorably correct the negative spherical aberration and the positive curvature of field occurring in the wide-angle end state, and thus to improve the optical performance.

In the variable focal distance lens system according to an embodiment of the present invention, the angle of view is wide in the wide-angle end state. In general, the wider the angle of view is, the more easily the deterioration of the performance due to the eccentricity occurring in the manufacturing process tends to occur.

In the variable focal distance lens system according to an embodiment of the present invention, therefore, to improve the optical performance on the design phase to achieve higher optical performance also in the manufacturing process, it is desirable to more favorably correct the fluctuation of a coma aberration based on the angle of view, which tends to occur in the wide-angle end state. In this case, it is desirable to set the upper limit value of the conditional expression (1) to be −0.30.

The conditional expression (2) is an expression specifying the shape of the interval formed between the negative lens of the second lens group and the cemented lens disposed on the image side of the negative lens.

If a value over the upper limit value of the conditional expression (2) is obtained, the off-axis light flux incident on the first lens group moves away from the optical axis in the wide-angle end state. Therefore, a large coma aberration occurs in a screen peripheral area, and favorable optical performance is not obtained. Further, the lens diameter of the first lens group is increased.

Meanwhile, if a value below the lower limit value of the conditional expression (2) is obtained, the most object-side surface of the cemented lens of the second lens group is shaped into a concave surface facing the object side. As a result, the mutual eccentricity of the negative lens and the cemented lens occurring in the manufacturing process is increased, as described above. Therefore, it is difficult to ensure stable optical performance in the manufacturing process.

Therefore, with the variable focal distance lens system satisfying the conditional expression (2), the occurrence of the coma aberration in the screen peripheral area is suppressed, and the mutual eccentricity of the negative lens and the cemented lens occurring in the manufacturing process is reduced. Accordingly, it is possible to improve the optical performance.

In the variable focal distance lens system according to an embodiment of the present invention, even when the most object-side surface of the cemented lens of the second lens group is formed into a concave surface, the performance deteriorated by the mutual eccentricity can be improved by eccentricity adjustment.

To make the off-axis light flux incident on the first lens group move toward the optical axis to reduce the lens diameter, the variable focal distance lens system according to an embodiment of the present invention is desired to satisfy the following conditional expression (3): $1.6 < f34w/fw < 2.1$, wherein f34w represents the combined focal distance of the third and fourth lens groups in the wide-angle end state, and fw represents the focal distance of the entire lens system in the wide-angle end state.

The conditional expression (3) is an expression specifying the combined focal distance of the third and fourth lens groups in the wide-angle end state.

If a value over the upper limit value of the conditional expression (3) is obtained, the position of the third lens group moves toward the object side, irrespective of the positional state of the lens system. Therefore, the entire lens length is increased, and a sufficient reduction in size is not achieved.

Meanwhile, if a value below the lower limit value of the conditional expression (3) is obtained, the principal ray incident on the third lens group forms a large angle with respect to the optical axis. Therefore, the off-axis light flux incident on the first lens group moves away from the optical axis, and the lens diameter of the first lens group is increased.

Therefore, with the variable focal distance lens system satisfying the conditional expression (3), it is possible to reduce the entire lens length and the lens diameter of the first lens group.

In the variable focal distance lens system according to an embodiment of the present invention, the third and fourth lens groups both have positive refractive power. Therefore, the height at which the off-axis light flux passes through the lens groups is not easily changed in accordance with the positional state of the lenses.

Therefore, to well balance the change in height at which the off-axis light flux passes through the lens groups, which accompanies the change in positional state of the lenses, and to favorably correct the off-axis aberration accompanying the change in positional state of the lenses, it is desirable to set the lower limit value of the conditional expression (3) to be 1.7.

The reason for setting the lower limit value of the conditional expression (3) at 1.7 being desirable will be described below. In the recording of a photographed image or video with the use of an image pickup device, the principal ray emitted from the fourth lens group is substantially parallel to the optical axis. Therefore, as the value of f34w/fw is reduced, the refractive power of the third lens group is increased, and the refractive power of the fourth lens group is reduced. Accordingly, the moving distance of the fourth lens group used to correct a change in image plane position accompanying the change in positional state of the lenses is increased. As a result, the change in height of the off-axis light flux passing through the fourth lens group is increased, but the change in height of the off-axis light flux passing through the third lens group is reduced.

Therefore, the lower limit value of the conditional expression (3) is set to be 1.7, as described above, to appropriately set the change in height at which the off-axis light flux passes through the third and fourth lens groups. Accordingly, it is possible to ensure favorable balance of the change in height, and to favorably correct the off-axis aberration accompanying the change in positional state of the lenses.

In the variable focal distance lens system according to an embodiment of the present invention, it is desirable to appropriately configure the first lens group as described below to achieve a higher magnification, a further reduction in size, and higher performance.

The focal distance is long in the telescopic end state. If the magnification ratio is increased, therefore, it is desirable to favorably correct a chromatic aberration and a spherical aberration. Further, to achieve high performance, it is important to favorably correct the chromatic aberration and spherical aberration occurring in each of the lens groups. To favorably correct such aberrations and achieve high performance, it is desirable to use at least one positive lens and at least one negative lens.

Further, to reduce the entire lens length and the lens diameter in the telescopic end state, it is desirable to configure the first lens group to include a negative lens having a concave surface facing the image side, a first positive lens having a convex surface facing the object side, and a second positive lens having a convex surface facing the object side, which are sequentially disposed from the object side to the image side.

In the variable focal distance lens system according to an embodiment of the present invention, the first lens group is configured as described above. With the negative lens disposed on the most object side, the off-axis light flux incident on the first lens group is moved toward the optical axis. At the same time, the two positive lenses are disposed to ensure strong positive refractive power.

The variable focal distance lens system according to an embodiment of the present invention is desired to be configured to satisfy the following conditional expression (4): $2.3<f1/(fw \cdot ft)^{1/2}<2.7$, wherein f1 represents the focal distance of the first lens group, and ft represents the focal distance of the entire lens system in the telescopic end state.

The conditional expression (4) is an expression specifying the focal distance of the first lens group and more favorably achieving a high magnification, a reduction in size, and high performance at the same time.

If a value over the upper limit value of the conditional expression (4) is obtained, the entire length of the first lens group in the telescopic end state is increased.

Meanwhile, if a value below the lower limit value of the conditional expression (4) is obtained, a negative spherical aberration caused by the first lens group is not favorably corrected. Particularly, in the telescopic end state, further improvement of the optical performance is not achieved.

Therefore, with the variable focal distance lens system satisfying the conditional expression (4), it is possible to reduce the entire length of the first lens group in the telescopic end state, and to favorably correct the negative spherical aberration caused by the first lens group and thus improve the optical performance.

In the variable focal distance lens system according to an embodiment of the present invention, it is desirable to set the lower limit value of the conditional expression (4) to be 2.4 to make the off-axis light flux passing through the first lens group move toward the optical axis to reduce the lens diameter.

Further, to suppress the deterioration of the performance due to an assembly error occurring in the manufacturing process, and thus to achieve stable optical performance also in the manufacturing process, it is desirable to cement the negative lens and the first positive lens together.

In the variable focal distance lens system according to an embodiment of the present invention, the second lens group uses the aspherical lens, as described above. Particularly, with appropriate setting of the thickness of the second lens group, a reduction in size and high performance can be both achieved.

The achievement of both a reduction in size and high performance is based on the placement of two aspherical surfaces at mutually distant positions in the second lens group to separately correct the refractive power at a position near the optical axis and the refractive power at a position distant from the optical axis.

Specifically, the entrance pupil position in a near-axis area and the entrance pupil position in a screen peripheral area are separately corrected. It is therefore possible to make the off-axis light flux incident on the first lens group move toward the optical axis. Accordingly, it is possible to reduce the lens diameter, and at the same time to favorably correct the fluctuation of the off-axis aberration accompanying the change in the angle of view.

To maintain a balance between a reduction in size and high performance, the variable focal distance lens system according to an embodiment of the present invention is desired to be configured to satisfy the following conditional expression (5): $1.0<\Sigma2/fw<1.3$, wherein $\Sigma2$ represents the thickness of the second lens group along the optical axis.

The conditional expression (5) is an expression specifying the thickness of the second lens group along the optical axis.

If a value below the lower limit value of the conditional expression (5) is obtained, the thickness of the second lens group is reduced. Therefore, it is possible to reduce the lens diameter. However, the refractive power of the object-side surface of the negative lens is substantially different between a central area and a peripheral area. Therefore, even minute eccentricity results in considerable deterioration of the optical performance. Further, the refractive power of the image-side surface of the cemented lens is also substantially different between a central area and a peripheral area, similarly as in the object-side surface of the negative lens. As a result, the optical performance is deteriorated.

If a value over the upper limit value of the conditional expression (5) is obtained, the off-axis light flux incident on the first lens group moves away from the optical axis, and thus the lens diameter is increased.

Therefore, with the variable focal distance lens system satisfying the conditional expression (5), it is possible to suppress the change in refractive power based on the position in the surfaces of the lenses, and thus to improve the optical performance. Further, with the off-axis light flux incident on the first lens group moved toward the optical axis, it is possible to achieve a reduction in size.

In the variable focal distance lens system according to an embodiment of the present invention, the angle of view is wide in the wide-angle end state. To achieve higher performance, therefore, it is important to favorably correct the fluctuation of the coma aberration accompanying the change in the angle of view in the wide-angle end state. Therefore, the variable focal distance lens system according to an embodiment of the present invention is desired to satisfy the following conditional expression (6): $0.25<R22<D2w<0.35$, wherein D2w represents the distance from an aperture stop to the image-side surface of the negative lens of the second lens group disposed on the most object side in the wide-angle end state.

The conditional expression (6) is an expression specifying the radius of curvature of the negative lens of the second lens group.

If a value below the lower limit value of the conditional expression (6) is obtained, a high-order curvature of field occurs in the negative lens of the second lens group. As a result, the optical performance is deteriorated.

Meanwhile, if a value over the upper limit value of the conditional expression (6) is obtained, the off-axis light flux incident on the second lens group forms a large angle with respect to the optical axis. Therefore, the optical performance is considerably deteriorated due to the eccentricity of the second lens group occurring in the manufacturing process.

Therefore, with the variable focal distance lens system satisfying the conditional expression (6), the occurrence of the curvature of field in the negative lens of the second lens group is suppressed, and the off-axis light flux incident on the second lens group forms a small angle with respect to the optical axis. Accordingly, it is possible to improve the optical performance.

In the variable focal distance lens system according to an embodiment of the present invention, the aperture stop is disposed on the object side of the third lens group. Further, during the change in positional state of the lenses, the aperture stop and the third lens group are integrally moved. Accordingly, it is possible to achieve a further reduction in lens diameter and a simpler lens barrel structure.

Further, with the aperture stop disposed on the object side of the third lens group, it is possible to make the off-axis light flux passing through the first lens group move toward the optical axis particularly in the wide-angle end state, and thus to achieve a reduction in size. At the same time, with the off-axis light flux passing through the first lens group moved toward the optical axis in the wide-angle end state, it is possible to suppress the occurrence of the coma aberration in the screen peripheral area, and thus to achieve high performance.

To favorably correct the negative spherical aberration occurring in the third lens group alone and reduce the entire length of the lens system, the variable focal distance lens system according to an embodiment of the present invention is desired to satisfy the following conditional expression (7): $0.06 < dS3/R31 < 0.10$, wherein dS3 represents the distance along the optical axis between the aperture stop and the most object-side surface of the third lens group, and R31 represents the radius of curvature of the most object-side surface of the third lens group.

The conditional expression (7) is an expression specifying the shape of the most object-side surface of the third lens group.

The third lens group has strong refractive power to converge the light flux diffused by the second lens group. Therefore, the role of the most object-side surface of the third lens group is important to optimize the shape of the third lens group and achieve higher performance.

If a value over the upper limit value of the conditional expression (7) is obtained, the negative spherical aberration occurring in the third lens group is not favorably corrected, and higher performance is not achieved.

Meanwhile, if a value below the lower limit value of the conditional expression (7) is obtained, a reduction in the entire length of the lens system in the telescopic end state is not achieved.

Therefore, with the variable focal distance lens system satisfying the conditional expression (7), it is possible to favorably correct the negative spherical aberration occurring in the third lens group, and to reduce the entire length of the lens system in the telescopic end state.

To achieve higher performance, the variable focal distance lens system according to an embodiment of the present invention is desired to satisfy the following conditional expression (8): $2 < f3/fw < 2.3$, wherein f3 represents the focal distance of the third lens group.

The conditional expression (8) is an expression specifying the focal distance of the third lens group.

If a value below the lower limit value of the conditional expression (8) is obtained, it is difficult to favorably correct the fluctuation of the coma aberration accompanying the change in the angle of view in the wide-angle end state, and sufficiently high performance is not achieved.

Meanwhile, if a value over the upper limit value of the conditional expression (8) is obtained, the entire length of the lens system is increased irrespective of the positional state of the lenses. Therefore, a further reduction in size is not achieved.

Therefore, with the variable focal distance lens system satisfying the conditional expression (8), it is possible to favorably correct the fluctuation of the coma aberration in the wide-angle end state, and to reduce the entire length of the lens system irrespective of the positional state of the lenses.

To favorably correct a positive spherical aberration caused by the second lens group and achieve higher performance, the variable focal distance lens system according to an embodiment of the present invention is desired to satisfy the following conditional expression (9): $-1 < 1/\beta 2t < -0.8$, wherein $\beta 2t$ represents the lateral magnification of the second lens group in the telescopic end state.

The conditional expression (9) is an expression specifying the lateral magnification of the second lens group.

If a value over the upper limit value of the conditional expression (9) is obtained, the positive spherical aberration occurring in the second lens group is not sufficiently corrected. Therefore, sufficiently high performance is not achieved.

Meanwhile, if a value below the lower limit value of the conditional expression (9) is obtained, the entire length of the lens system in the telescopic end state is not sufficiently reduced. Therefore, a sufficient reduction in size is not achieved.

Therefore, with the variable focal distance lens system satisfying the conditional expression (9), it is possible to sufficiently correct the positive spherical aberration occurring in the second lens group, and to reduce the entire length of the lens system in the telescopic end state.

In a lens suitable for an imaging device (camera) for recording a subject image by using an image pickup device, the exit pupil position is apart from the image plane, i.e., the principal ray is substantially parallel to the optical axis. Therefore, when the light flux passing through the fourth lens group moves in the direction of the optical axis, the change in height of the ray is small. Due to this small change in height, the fourth lens group is suitable for a so-called short-distance focusing action to compensate for the fluctuation of the image plane position occurring when the subject position is changed.

In view of the above, in the variable focal distance lens system according to an embodiment of the present invention, the fourth lens group is configured to move in a short-distance focusing operation.

The position of the aperture stop is important to achieve both a reduction in lens diameter and high performance.

In general, with an increase in the number of lens groups which change the distance thereof from the aperture stop during the change in positional state of lenses, the height of the off-axis light flux passing through the respective lens groups changes more easily. The fluctuation of the off-axis aberration accompanying the change in positional state of the lenses is corrected with the use of the change in height of the off-axis light flux. If the height of the off-axis light flux is actively changed, the fluctuation of the off-axis aberration can be more favorably corrected. Further, if the aperture stop is disposed near the center of the lens system, the lens diameter can be reduced.

In the variable focal distance lens system according to an embodiment of the present invention, therefore, the aperture stop is disposed in the vicinity of the third lens group, as described above, to achieve both a reduction in lens diameter and high performance.

In the variable focal distance lens system according to an embodiment of the present invention, if one lens group or a part thereof selected from the first to fourth lens groups is moved (shifted) in a direction substantially perpendicular to the optical axis, the image can be shifted. With the combination of a detection system which moves a lens group or a part thereof in a direction substantially perpendicular to the optical axis in the above-described manner and detects an image blur, a drive system which shifts the respective lens groups, and a control system which provides the drive system with a shift amount on the basis of the output from the detection system, it is possible to make the variable focal distance lens system function also as a vibration resistant optical system.

Particularly, in the variable focal distance lens system according to an embodiment of the present invention, if the third lens group is shifted in a direction substantially perpendicular to the optical axis, a change in performance occurring in the shift can be reduced.

Further, if the aperture stop is disposed in the vicinity of the third lens group, the off-axis light flux passes through an area near the optical axis. Therefore, it is possible to suppress the fluctuation of the off-axis aberration occurring when the third lens group is shifted in a direction substantially perpendicular to the optical axis.

In the variable focal distance lens system according to an embodiment of the present invention, it is also possible to provide a low-pass filter to the image side of the lens system to prevent the generation of moire fringes, and to provide an infrared cut filter in accordance with the spectral sensitivity characteristic of light-receiving elements.

Further, when high performance is given priority over a reduction in size, a third positive lens having positive refractive power and having a convex surface facing the object side is desired to be provided on the image side of the second positive lens of the first lens group.

Further, if an aspherical lens is introduced in the third or fourth lens group, higher performance can be achieved in a central area.

In addition, if a plurality of aspherical surfaces are formed in an optical system of the variable focal distance lens system, higher optical performance can be ensured.

Numerical Value Embodiments: Subsequently, with reference to the drawings and tables, description will be made of specific embodiments of the variable focal distance lens system according to an embodiment of the present invention, and numerical value embodiments obtained by applying specific numerical values to the embodiments.

The meanings and so forth of symbols used in the following tables and descriptions are as follows.

The symbols "f" and "Fno" represent the focal distance and the F number, respectively, and "2ω" and "Di" represent the angle of view and the axial surface interval between the i-th surface and the i+1-th surface, respectively. As for the surface number, "S" represents the aperture stop. As for the radius of curvature, "ASP" indicates that the corresponding surface is an aspherical surface. Further, "K" represents the conic constant, and "A," "B," "C," and "D" represent the fourth-order aspheric coefficient, the sixth-order aspheric coefficient, the eighth-order aspheric coefficient, and the tenth-order aspheric coefficient, respectively. Further, "Bf" represents back focus.

Further, the refractive index represents a value at the d-line (λ=587.6 nm), and a radius of curvature of "0.0000" indicates that the corresponding surface is a flat surface.

Some of the lenses used in the numerical value embodiments include a lens surface formed into an aspherical surface. The aspherical surface shape is defined by the following formula 1, wherein "x" represents the distance from the apex of the lens surface in the direction of the optical axis, "y" represents the height in a direction perpendicular to the optical axis (image height), "c" represents the paraxial curvature at the apex of the lens (the inverse of the radius of curvature), "κ" represents the conic constant, and "A," "B," and so forth represent the fourth-order aspheric coefficient, the sixth-order aspheric coefficient, and so forth.

$$X = cy^2/[1+\{1-(1+\kappa)c^2y^2\}^{1/2}] + Ay^4 + By^6 + \ldots \quad \text{Formula 1}$$

FIG. 1 is a diagram illustrating refractive power distribution of the variable focal distance lens system according to the embodiments of the present invention. Each of the embodiments is configured to include a first lens group G1 having positive refractive power, a second lens group G2 having negative refractive power, a third lens group G3 having positive refractive power, and a fourth lens group G4 having positive refractive power, which are sequentially disposed from the object side to the image side.

In the embodiments, during a change in positional state of lenses from a wide-angle end state to a telescopic end state, the interval between the first lens group G1 and the second lens group G2 is increased, the interval between the second lens group G2 and the third lens group G3 is reduced, and the interval between the third lens group G3 and the fourth lens group G4 is changed.

Further, during the change in positional state of the lenses from the wide-angle end state to the telescopic end state, all lens groups G1, G2, G3, and G4 are movable. An aperture stop S is disposed in the vicinity of the object side of the third lens group G3. The fourth lens group G4 moves to compensate for the fluctuation of the image plane position accompanying the movement of the lens groups G1, G2, G3, and G4, and moves toward the object side in a short-distance focusing operation.

First Embodiment

Figure 2:
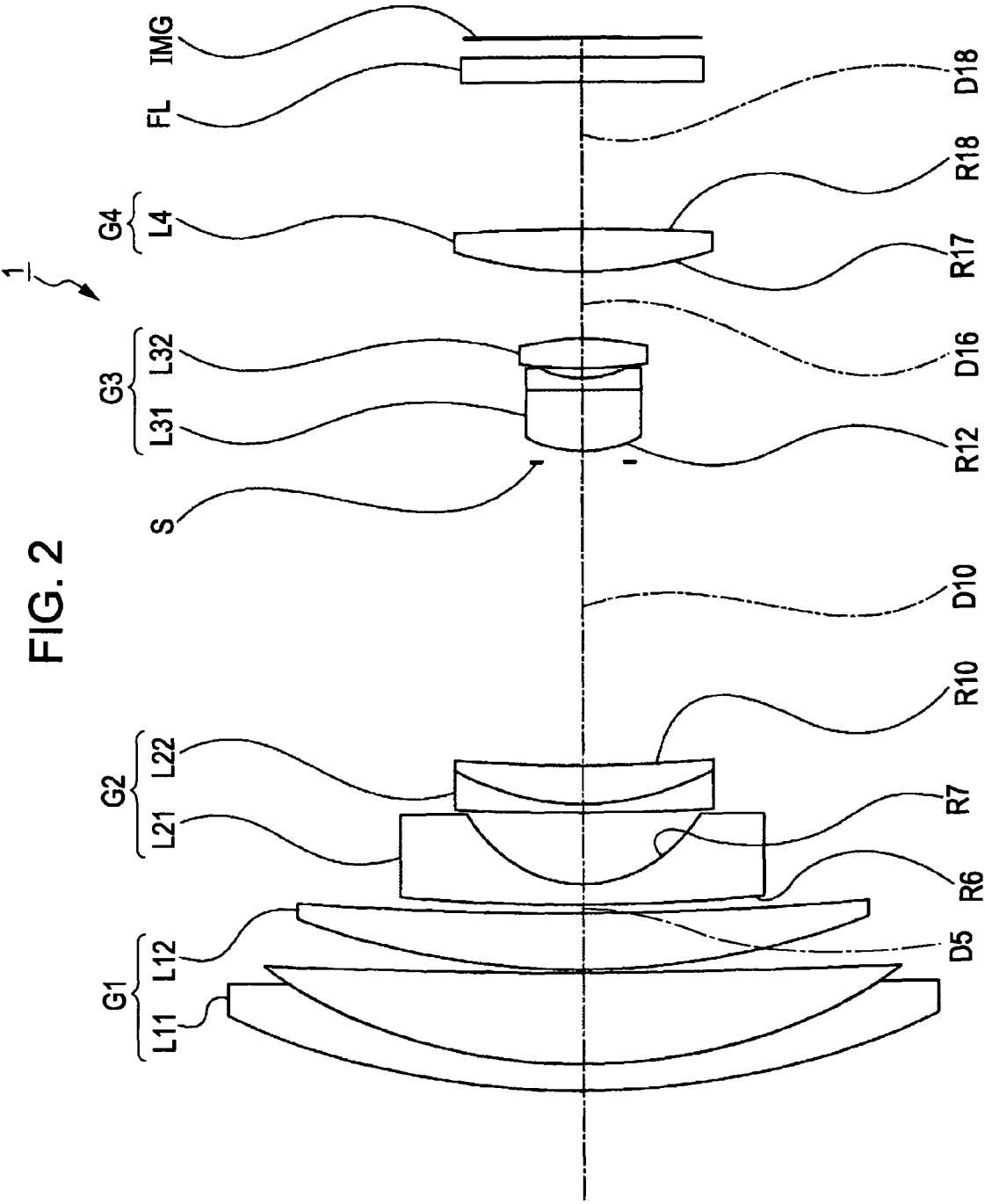
FIG. 2 is a diagram illustrating a lens configuration of a variable focal distance lens system according to a first embodiment of the present invention.

FIG. 2 illustrates a lens configuration of a variable focal distance lens system 1 according to a first embodiment of the present invention. The variable focal distance lens system 1 includes ten lenses.

The first lens group G1 is configured to include a cemented lens L11 formed by a meniscus-shaped negative lens having a convex surface facing the object side and a first positive lens having a convex surface facing the object side, and a meniscus-shaped second positive lens L12 having a convex surface facing the object side.

The second lens group G2 is configured to include a meniscus-shaped first negative lens L21 having a concave surface facing the image side, and a cemented lens L22 formed by a second negative lens having a concave surface facing the image side and a positive lens having a convex surface facing the object side.

The third lens group G3 is configured to include a cemented lens L31 formed by a first positive lens having a convex surface facing the object side and a negative lens having a concave surface facing the image side, and a second positive lens L32 having two convex surfaces.

The fourth lens group G4 is configured to include a positive lens L4 having two convex surfaces.

Between the fourth lens group G4 and an image plane IMG, a filter FL is provided.

Table 1 presents lens data of a numerical value embodiment 1 obtained by applying specific numerical values to the variable focal distance lens system 1 according to the first embodiment.

TABLE 1 f 1.00~2.10~9.42
Fno 3.58~4.38~5.79
2ω 87.12~41.94~9.62

| SURFACE NUMBER | RADIUS OF CURVATURE | SURFACE INTERVAL | REFRACTIVE INDEX | ABBE NUMBER |
|---|---|---|---|---|
| 1 | 6.5315 | 0.226 | 1.84666 | 23.83 |
| 2 | 4.5115 | 0.740 | 1.49700 | 81.60 |
| 3 | 32.5526 | 0.034 | | |
| 4 | 6.0493 | 0.456 | 1.75500 | 52.30 |
| 5 | 23.2039 | (D5) | | |
| 6 | 9.6836 (ASP) | 0.180 | 1.85135 | 40.10 |
| 7 | 1.0206 (ASP) | 0.557 | | |
| 8 | 38.3310 | 0.079 | 1.61800 | 63.39 |
| 9 | 1.9169 | 0.332 | 2.00178 | 19.32 |
| 10 | 5.0807 (ASP) | (D10) | | |
| 11(S) | 0.0000 | 0.090 | | |
| 12 | 1.0195 (ASP) | 0.521 | 1.74330 | 49.22 |
| 13 | 0.0000 | 0.090 | 1.76182 | 26.61 |
| 14 | 0.9781 | 0.072 | | |
| 15 | 3.4011 | 0.239 | 1.56384 | 60.83 |
| 16 | −1.9726 | (D16) | | |
| 17 | 3.1029 (ASP) | 0.365 | 1.55332 | 71.67 |
| 18 | −225.5158 (ASP) | (D18) | | |
| 19 | 0.0000 | 0.210 | 1.51680 | 64.20 |
| 20 | 0.0000 | (Bf) | | |

In the variable focal distance lens system 1, each of the object-side surface (R6) of the first negative lens L21 of the second lens group G2, the image-side surface (R7) of the first negative lens L21 of the second lens group G2, the most image-side surface (R10) of the cemented lens L22 of the second lens group G2, the most object-side surface (R12) of the cemented lens L31 of the third lens group G3, the object-side surface (R17) of the positive lens L4 of the fourth lens group G4, and the image-side surface (R18) of the positive lens L4 of the fourth lens group G4 is formed into an aspherical surface. Table 2 presents, as well as the conic constant κ, the fourth-order aspheric coefficient A, the sixth-order aspheric coefficient B, the eighth-order aspheric coefficient C, and the tenth-order aspheric coefficient D of each of the aspherical surfaces in the numerical value embodiment 1.

In Table 2 and other tables presenting aspheric coefficients, which will be described later, "E-i" represents an exponential expression with a base of 10, i.e., "$10^{-i}$." For example, "0.12345E-05" represents "$0.12345 \times 10^{-5}$."

TABLE 2

| 6TH SURFACE | κ = 0.0000 | A = 0.135472E−01 | B = −0.364466E−01 | C = 0.151641E−01 | D = −0.220023E−02 |
| 7TH SURFACE | κ = −0.8858 | A = 0.138540E+00 | B = 0.559594E−01 | C = −0.175884E−01 | D = −0.535794E−01 |
| 10TH SURFACE | κ = 0.0000 | A = −0.449927E−01 | B = −0.653602E−02 | C = −0.344701E−02 | D = 0.155780E−01 |
| 12TH SURFACE | κ = −0.5974 | A = −0.892823E−02 | B = 0.930879E−01 | C = −0.381389E+00 | D = 0.777461E+00 |
| 17TH SURFACE | κ = 6.5825 | A = −0.270797E−01 | B = −0.254666E−01 | C = 0.113320E−01 | D = −0.238724E−01 |
| 18TH SURFACE | κ = 0.0000 | A = 0.913264E−03 | B = −0.213113E−01 | C = 0.000000E+00 | D = 0.000000E+00 |

In the variable focal distance lens system 1, during a change in magnification between the wide-angle end state and the telescopic end state, a change occurs in a surface interval D5 between the first lens group G1 and the second lens group G2, a surface interval D10 between the second lens group G2 and the aperture stop S, a surface interval D16 between the third lens group G3 and the fourth lens group G4, and a surface interval D18 between the fourth lens group G4 and the filter FL. Table 3 presents, as well as the back foci Bf, variable intervals in a wide-angle end state (focal distance f=1.000), an intermediate focal distance state (focal distance f=2.101), and a telescopic end state (focal distance f=9.420) of the respective surface intervals in the numerical value embodiment 1.

TABLE 3

| f | 1.000 | 2.101 | 9.420 |
|---|---|---|---|
| D5 | 0.079 | 1.394 | 4.346 |
| D10 | 2.499 | 1.180 | 0.056 |
| D16 | 0.541 | 1.006 | 3.103 |
| D18 | 1.189 | 1.508 | 0.528 |
| Bf | 0.182 | 0.182 | 0.182 |

Figure 3:
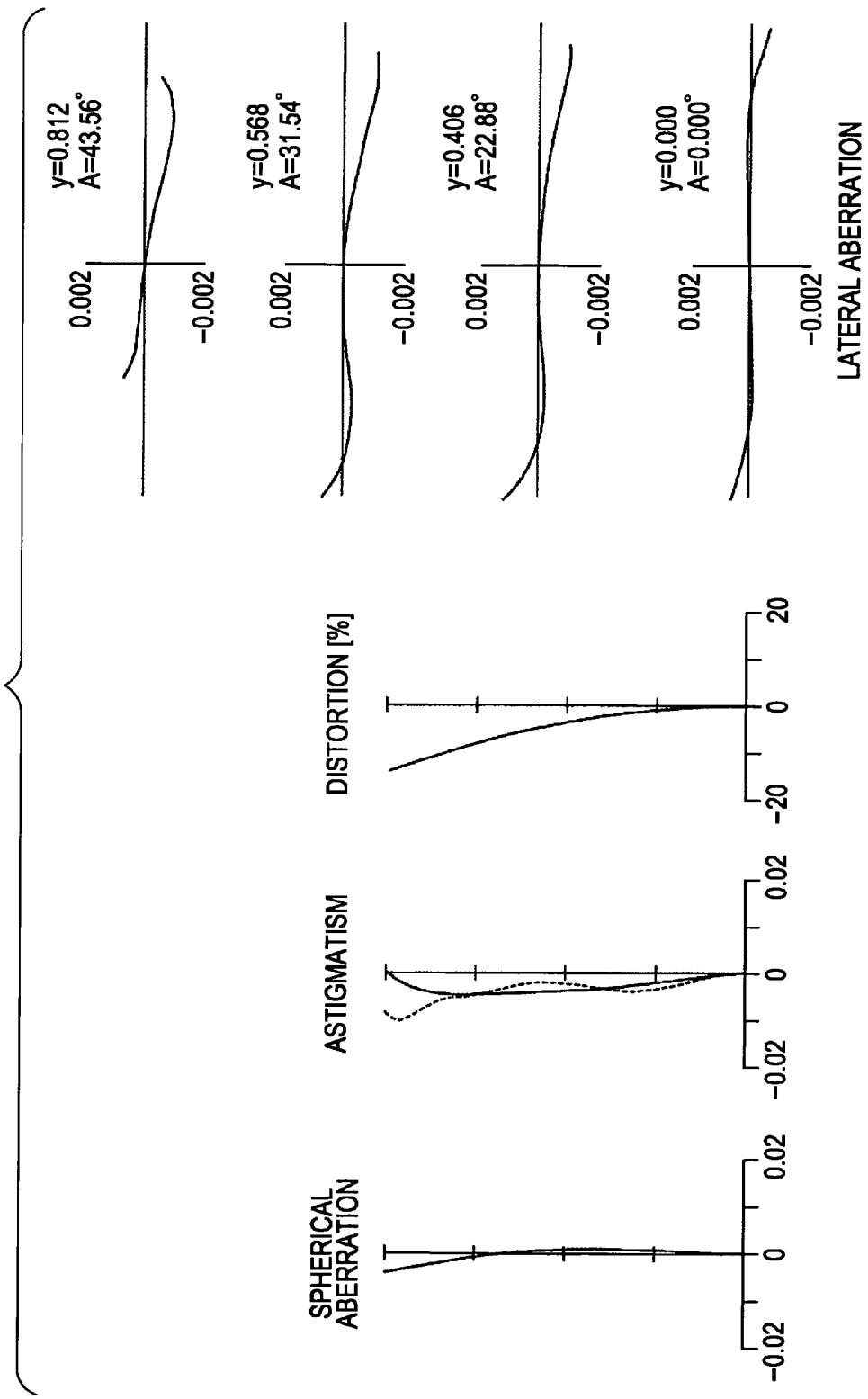
FIG. 3 is a diagram illustrating, together with FIGS. 4 and 5, aberration diagrams of numerical value embodiments obtained by applying specific numerical values to the first embodiment, and illustrating spherical aberration, astigmatism, distortion, and lateral aberration in a wide-angle end state.
Figure 4:
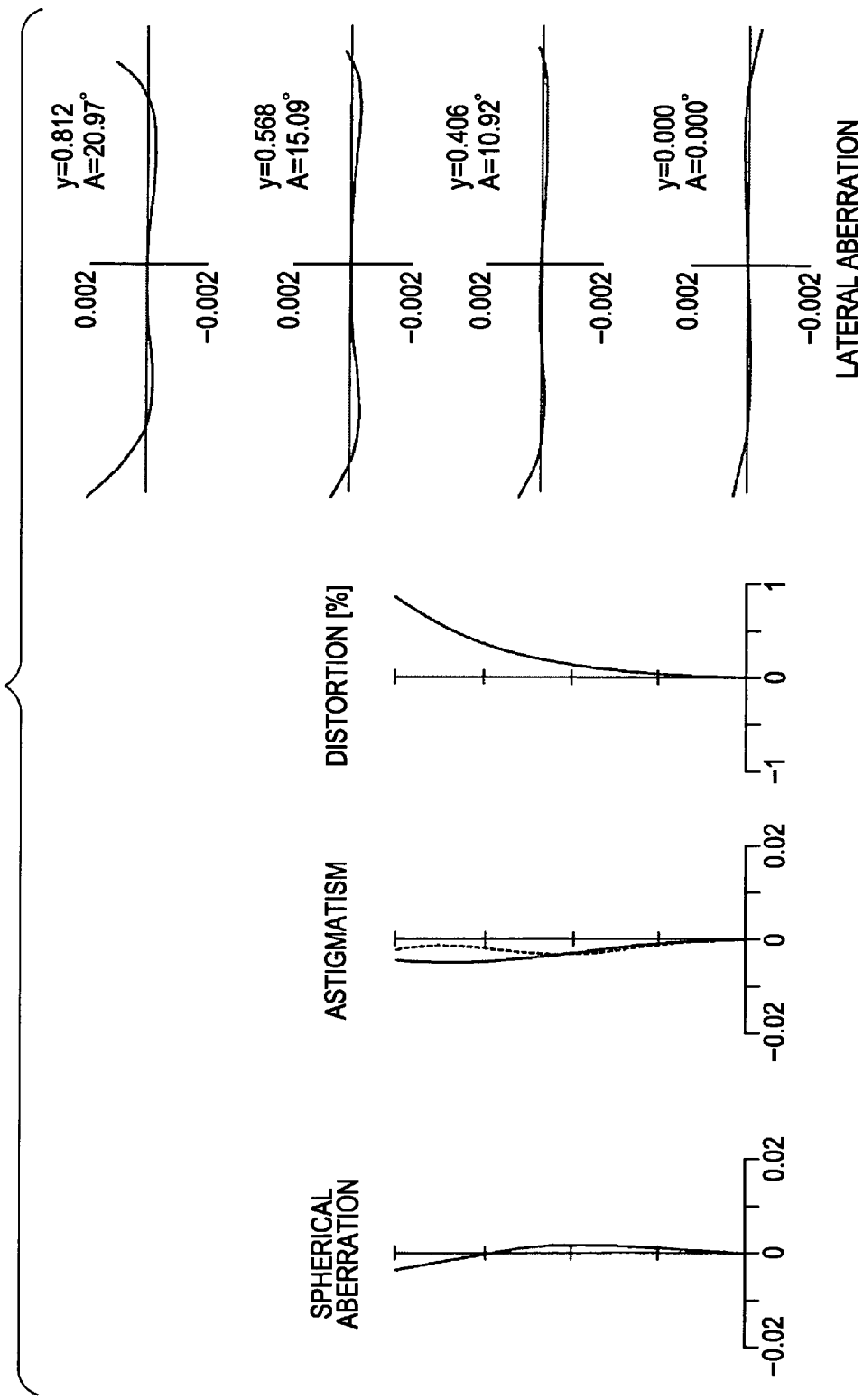
FIG. 4 is a diagram illustrating spherical aberration, astigmatism, distortion, and lateral aberration in an intermediate focal distance state.
Figure 5:
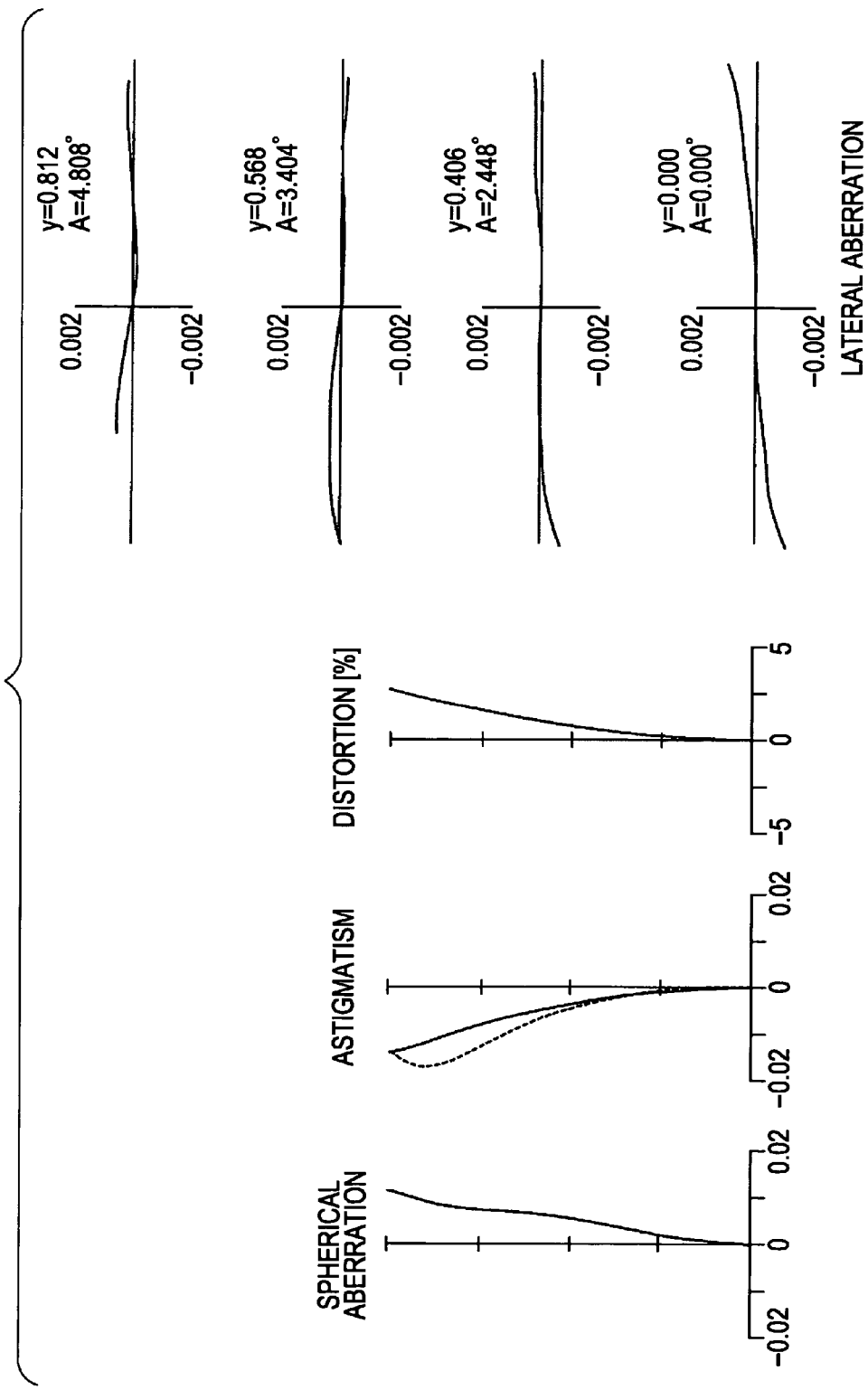
FIG. 5 is a diagram illustrating spherical aberration, astigmatism, distortion, and lateral aberration in a telescopic end state.

FIGS. 3 to 5 illustrate aberration diagrams in an infinity focusing state in the numerical value embodiment 1. FIG. 3 illustrates aberration diagrams in the wide-angle end state (focal distance f=1.000). FIG. 4 illustrates aberration diagrams in the intermediate focal distance state (focal distance f=2.101). FIG. 5 illustrates aberration diagrams in the telescopic end state (focal distance f=9.420).

In astigmatism diagrams of FIGS. 3 to 5, solid lines indicate values on the sagittal image plane, and broken lines indicate values on the meridional image plane. In lateral aberration diagrams, "y" and "A" represent the image height and the half angle of view, respectively.

It is obvious from the aberration diagrams that the numerical value embodiment 1 favorably corrects aberrations and has excellent imaging performance.

Second Embodiment

Figure 6:
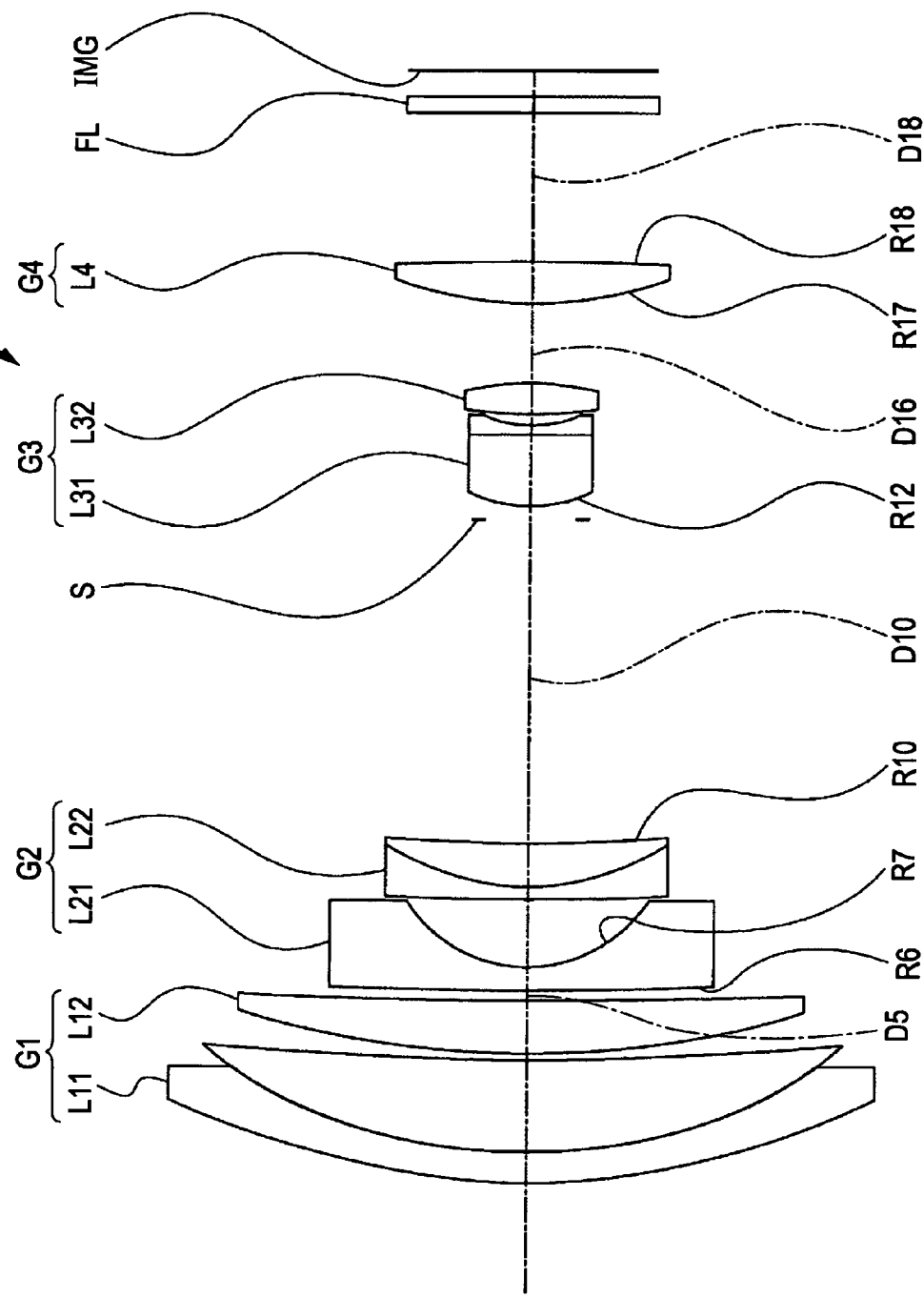
FIG. 6 is a diagram illustrating a lens configuration of a variable focal distance lens system according to a second embodiment of the present invention.

FIG. 6 illustrates a lens configuration of a variable focal distance lens system 2 according to a second embodiment of the present invention. The variable focal distance lens system 2 includes ten lenses.

The first lens group G1 is configured to include a cemented lens L11 formed by a meniscus-shaped negative lens having a convex surface facing the object side and a first positive lens having a convex surface facing the object side, and a meniscus-shaped second positive lens L12 having a convex surface facing the object side.

The second lens group G2 is configured to include a meniscus-shaped first negative lens L21 having a concave surface facing the image side, and a cemented lens L22 formed by a second negative lens having a concave surface facing the image side and a positive lens having a convex surface facing the object side.

The third lens group G3 is configured to include a cemented lens L31 formed by a first positive lens having a convex surface facing the object side and a negative lens having a concave surface facing the image side, and a second positive lens L32 having two convex surfaces.

The fourth lens group G4 is configured to include a positive lens L4 having two convex surfaces.

Between the fourth lens group G4 and an image plane IMG, a filter FL is provided.

Table 4 presents lens data of a numerical value embodiment 2 obtained by applying specific numerical values to the variable focal distance lens system 2 according to the second embodiment.

In the variable focal distance lens system 2, each of the object-side surface (R6) of the first negative lens L21 of the second lens group G2, the image-side surface (R7) of the first negative lens L21 of the second lens group G2, the most image-side surface (R10) of the cemented lens L22 of the second lens group G2, the most object-side surface (R12) of the cemented lens L31 of the third lens group G3, the object-side surface (R17) of the positive lens L4 of the fourth lens group G4, and the image-side surface (R18) of the positive lens L4 of the fourth lens group G4 is formed into an aspherical surface. Table 5 presents, as well as the conic constant $\kappa$, the fourth-order aspheric coefficient A, the sixth-order aspheric coefficient B, the eighth-order aspheric coefficient C, and the tenth-order aspheric coefficient D of each of the aspherical surfaces in the numerical value embodiment 2.

TABLE 5

| | | | | | |
|---|---|---|---|---|---|
| 6TH SURFACE | $\kappa$ = 0.0000 | A = 0.388214E−01 | B = −0.391802E−01 | C = 0.116370E−01 | D = −0.113549E−02 |
| 7TH SURFACE | $\kappa$ = −0.0305 | A = 0.700246E−01 | B = −0.204887E−03 | C = 0.630714E−01 | D = −0.152838E+00 |
| 10TH SURFACE | $\kappa$ = 0.0000 | A = −0.377150E−01 | B = −0.135623E−01 | C = −0.992929E−03 | D = 0.181002E−01 |
| 12TH SURFACE | $\kappa$ = −0.5954 | A = −0.892154E−02 | B = 0.170812E+00 | C = −0.123781E+01 | D = 0.341403E+01 |
| 17TH SURFACE | $\kappa$ = −10.0000 | A = 0.321400E−01 | B = 0.953177E−02 | C = −0.259503E−01 | D = 0.127175E−01 |
| 18TH SURFACE | $\kappa$ = 0.0000 | A = −0.150195E−01 | B = −0.262525E−02 | C = 0.000000E+00 | D = 0.000000E+00 |

In the variable focal distance lens system 2, during a change in magnification between the wide-angle end state and the telescopic end state, a change occurs in a surface interval D5 between the first lens group G1 and the second lens group G2, a surface interval D10 between the second lens group G2 and the aperture stop S, a surface interval D16 between the third lens group G3 and the fourth lens group G4, and a surface interval D18 between the fourth lens group G4 and the filter FL. Table 6 presents, as well as the back foci Bf, variable intervals in a wide-angle end state (focal distance f=1.000), an intermediate focal distance state (focal distance f=2.101), and a telescopic end state (focal distance f=9.414) of the respective surface intervals in the numerical value embodiment 2.

TABLE 4 f 1.00~2.10~9.41
Fno 3.56~4.37~5.75
2ω 87.19~42.28~9.62

| SURFACE NUMBER | RADIUS OF CURVATURE | SURFACE INTERVAL | REFRACTIVE INDEX | ABBE NUMBER |
|---|---|---|---|---|
| 1 | 5.9308 | 0.214 | 1.84666 | 23.83 |
| 2 | 4.0138 | 0.715 | 1.49700 | 81.60 |
| 3 | 17.0965 | 0.045 | | |
| 4 | 6.2807 | 0.451 | 1.80420 | 46.50 |
| 5 | 32.8475 | (D5) | | |
| 6 | 30.4916 (ASP) | 0.180 | 1.85135 | 40.10 |
| 7 | 1.1005 (ASP) | 0.557 | | |
| 8 | 22.5561 | 0.079 | 1.61800 | 63.39 |
| 9 | 1.9173 | 0.341 | 2.00178 | 19.32 |
| 10 | 5.1425 (ASP) | (D10) | | |
| 11(S) | 0.0000 | 0.079 | | |
| 12 | 1.0684 (ASP) | 0.573 | 1.74330 | 49.22 |
| 13 | −600.8425 | 0.090 | 1.76182 | 26.61 |
| 14 | 1.0150 | 0.065 | | |
| 15 | 3.4374 | 0.232 | 1.60300 | 65.44 |
| 16 | −2.2049 | (D16) | | |
| 17 | 2.9276 (ASP) | 0.352 | 1.55332 | 71.67 |
| 18 | −225.5608 (ASP) | (D18) | | |
| 19 | 0.0000 | 0.113 | 1.51680 | 64.20 |
| 20 | 0.0000 | (Bf) | | |

TABLE 6

| f | 1.000 | 2.101 | 9.414 |
|---|---|---|---|
| D5 | 0.079 | 1.331 | 4.290 |
| D10 | 2.599 | 1.248 | 0.056 |
| D16 | 0.637 | 1.282 | 3.213 |

TABLE 6-continued

| | | | |
|---|---|---|---|
| D18 | 1.156 | 1.394 | 0.533 |
| Bf | 0.228 | 0.228 | 0.228 |

Figure 7:
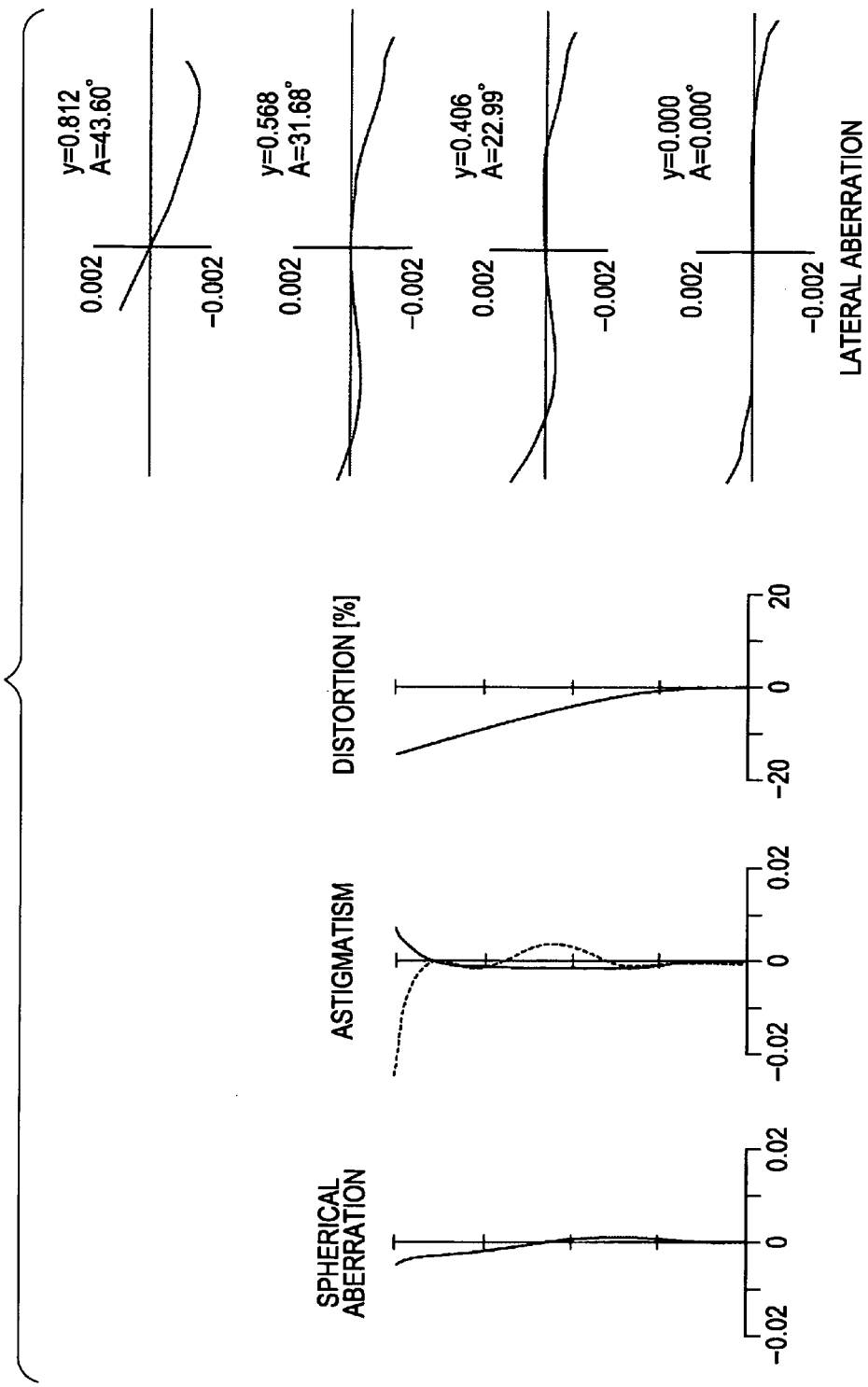
FIG. 7 is a diagram illustrating, together with FIGS. 8 and 9, aberration diagrams of numerical value embodiments obtained by applying specific numerical values to the second embodiment, and illustrating spherical aberration, astigmatism, distortion, and lateral aberration in a wide-angle end state.
Figure 8:
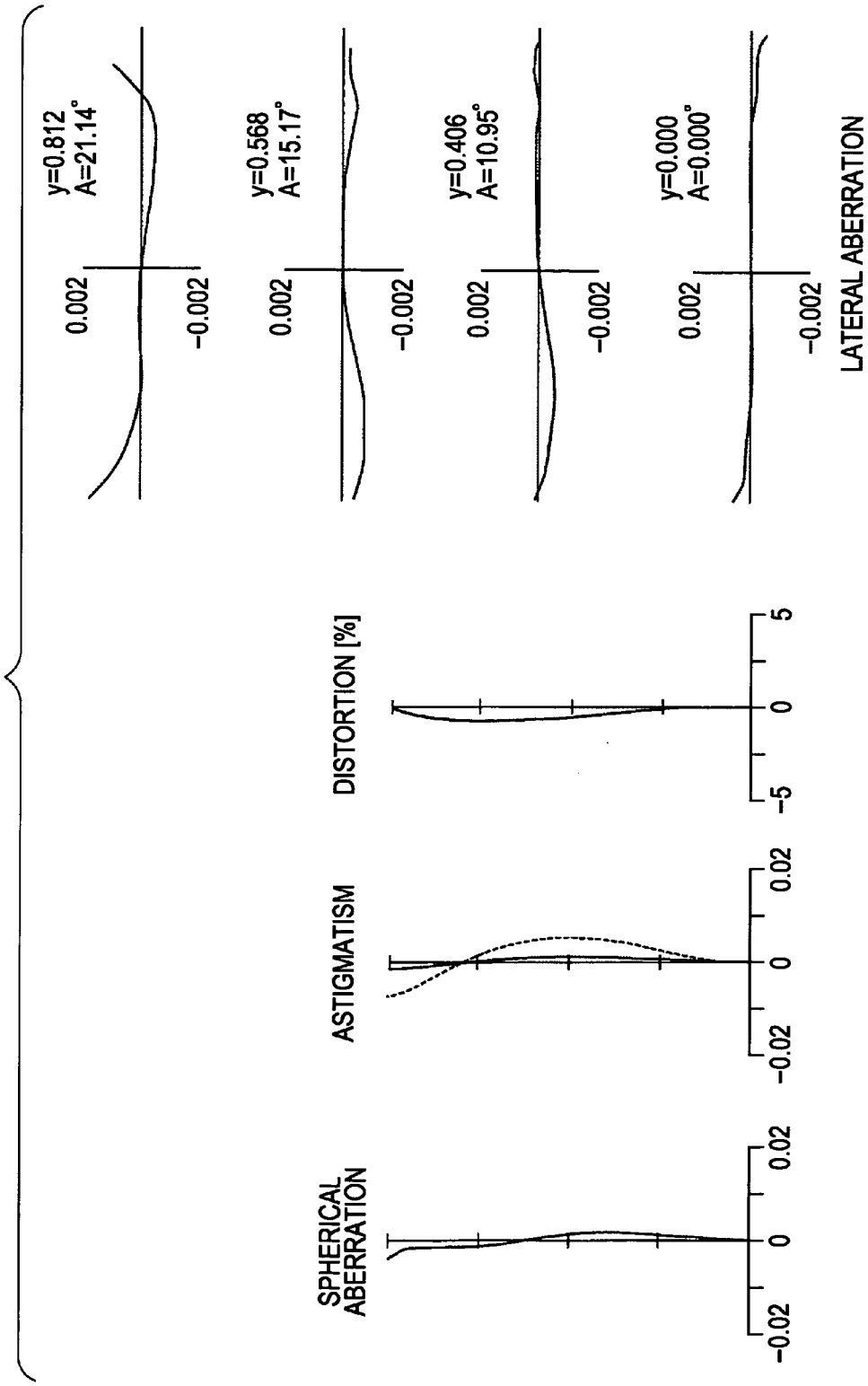
FIG. 8 is a diagram illustrating spherical aberration, astigmatism, distortion, and lateral aberration in an intermediate focal distance state.
Figure 9:
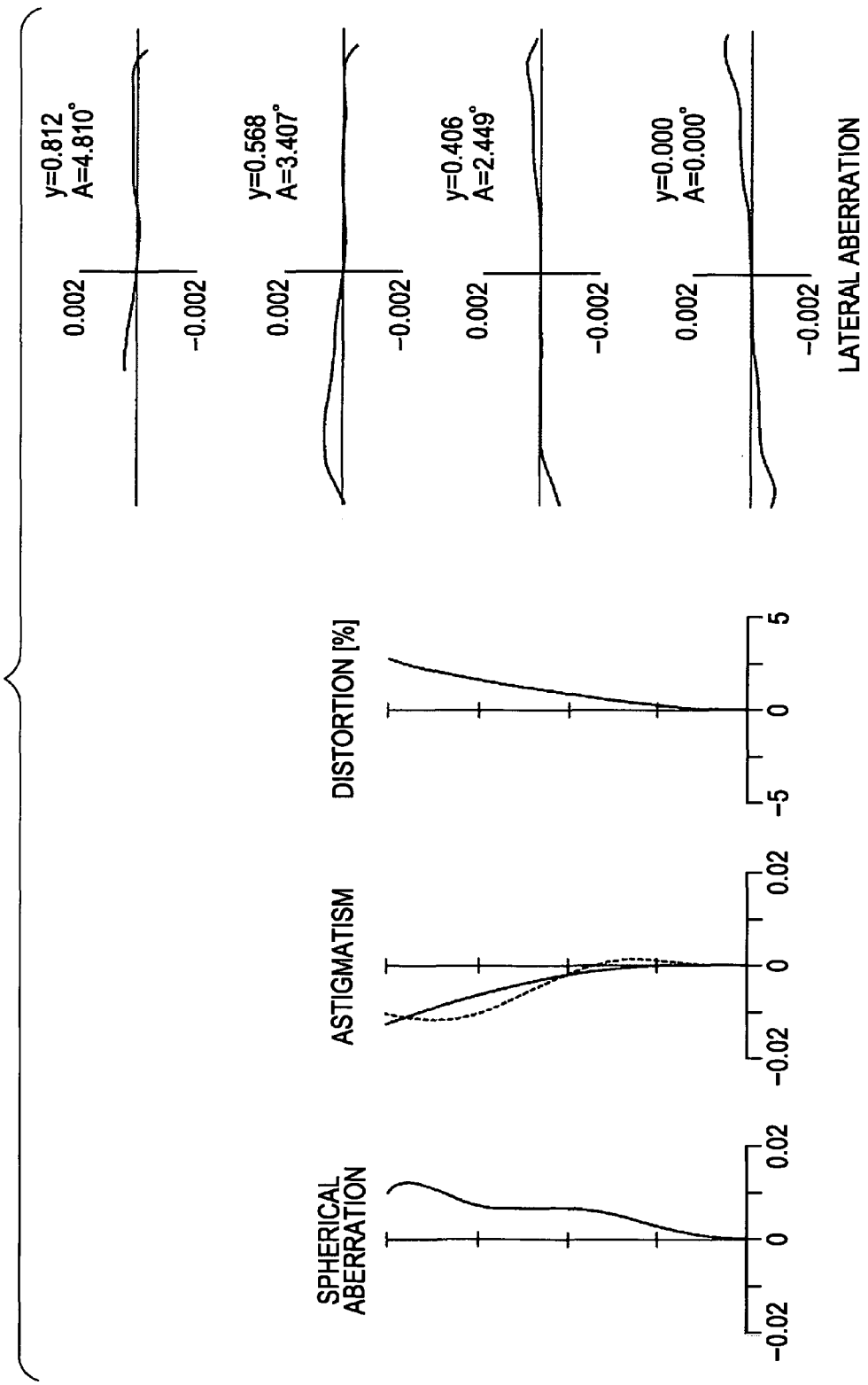
FIG. 9 is a diagram illustrating spherical aberration, astigmatism, distortion, and lateral aberration in a telescopic end state.

FIGS. 7 to 9 illustrate aberration diagrams in an infinity focusing state in the numerical value embodiment 2. FIG. 7 illustrates aberration diagrams in the wide-angle end state (focal distance f=1.000). FIG. 8 illustrates aberration diagrams in the intermediate focal distance state (focal distance f=2.101). FIG. 9 illustrates aberration diagrams in the telescopic end state (focal distance f=9.414).

In astigmatism diagrams of FIGS. 7 to 9, solid lines indicate values on the sagittal image plane, and broken lines indicate values on the meridional image plane. In lateral aberration diagrams, "y" and "A" represent the image height and the half angle of view, respectively.

It is obvious from the aberration diagrams that the numerical value embodiment 2 favorably corrects aberrations and has excellent imaging performance.

Third Embodiment

Figure 10:
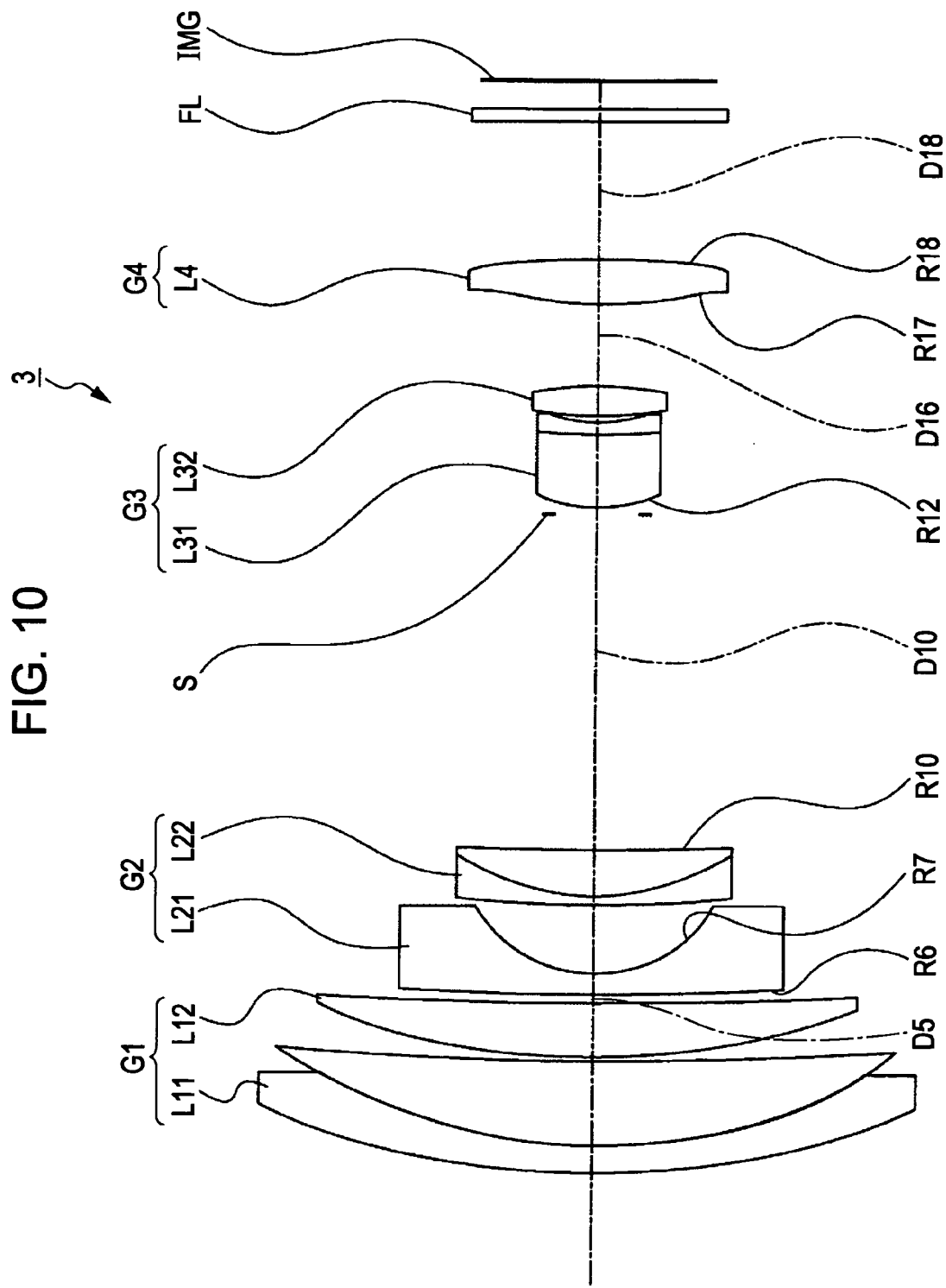
FIG. 10 is a diagram illustrating a lens configuration of a variable focal distance lens system according to a third embodiment of the present invention.

FIG. 10 illustrates a lens configuration of a variable focal distance lens system 3 according to a third embodiment of the present invention. The variable focal distance lens system 3 includes ten lenses.

The first lens group G1 is configured to include a cemented lens L11 formed by a meniscus-shaped negative lens having a convex surface facing the object side and a first positive lens having a convex surface facing the object side, and a meniscus-shaped second positive lens L12 having a convex surface facing the object side.

The second lens group G2 is configured to include a meniscus-shaped first negative lens L21 having a concave surface facing the image side, and a cemented lens L22 formed by a second negative lens having a concave surface facing the image side and a positive lens having a convex surface facing the object side.

The third lens group G3 is configured to include a cemented lens L31 formed by a first positive lens having a convex surface facing the object side and a negative lens having a concave surface facing the image side, and a second positive lens L32 having two convex surfaces.

The fourth lens group G4 is configured to include a positive lens L4 having two convex surfaces.

Between the fourth lens group G4 and an image plane IMG, a filter FL is provided.

Table 7 presents lens data of a numerical value embodiment 3 obtained by applying specific numerical values to the variable focal distance lens system 3 according to the third embodiment.

TABLE 7 f 1.00~2.10~9.43
Fno 3.58~4.38~5.76
2ω 87.33~42.16~9.59

| SURFACE NUMBER | RADIUS OF CURVATURE | SURFACE INTERVAL | REFRACTIVE INDEX | ABBE NUMBER |
|---|---|---|---|---|
| 1 | 6.3953 | 0.214 | 1.84666 | 23.83 |
| 2 | 4.2727 | 0.704 | 1.49700 | 81.60 |
| 3 | 21.9577 | 0.045 | | |
| 4 | 5.9937 | 0.426 | 1.77250 | 49.62 |
| 5 | 29.4615 | (D5) | | |
| 6 | 16.3833 (ASP) | 0.181 | 1.88072 | 37.27 |
| 7 | 1.0756 (ASP) | 0.555 | | |
| 8 | 11.2892 | 0.079 | 1.65100 | 56.16 |
| 9 | 1.7689 | 0.396 | 2.00178 | 19.32 |
| 10 | 4.8697 (ASP) | (D10) | | |
| 11(S) | 0.0000 | 0.079 | | |
| 12 | 1.1021 (ASP) | 0.603 | 1.75700 | 47.82 |
| 13 | 11.2892 | 0.090 | 1.80518 | 25.42 |
| 14 | 1.0443 | 0.060 | | |
| 15 | 2.9154 | 0.262 | 1.61800 | 63.39 |
| 16 | −2.3470 | (D16) | | |
| 17 | 3.0353 (ASP) | 0.332 | 1.49700 | 81.61 |
| 18 | −225.7846 (ASP) | (D18) | | |
| 19 | 0.0000 | 0.113 | 1.51680 | 64.20 |
| 20 | 0.0000 | (Bf) | | |

In the variable focal distance lens system 3, each of the object-side surface (R6) of the first negative lens L21 of the second lens group G2, the image-side surface (R7) of the first negative lens L21 of the second lens group G2, the most image-side surface (R10) of the cemented lens L22 of the second lens group G2, the most object-side surface (R12) of the cemented lens L31 of the third lens group G3, the object-side surface (R17) of the positive lens L4 of the fourth lens group G4, and the image-side surface (R18) of the positive lens L4 of the fourth lens group G4 is formed into an aspherical surface. Table 8 presents, as well as the conic constant κ, the fourth-order aspheric coefficient A, the sixth-order aspheric coefficient B, the eighth-order aspheric coefficient C, and the tenth-order aspheric coefficient D of each of the aspherical surfaces in the numerical value embodiment 3.

TABLE 8

| | | | | | |
|---|---|---|---|---|---|
| 6TH SURFACE | κ = 0.0000 | A = 0.198973E−01 | B = −0.267123E−01 | C = 0.815779E−02 | D = −0.844254E−03 |
| 7TH SURFACE | κ = −0.1785 | A = 0.536377E−01 | B = 0.838391E−03 | C = 0.366110E−01 | D = −0.967430E−01 |
| 10TH SURFACE | κ = 0.0000 | A = −0.353608E−01 | B = −0.965007E−02 | C = −0.650992E−02 | D = 0.163658E−01 |
| 12TH SURFACE | κ = −0.5698 | A = −0.890215E−02 | B = 0.147378E+00 | C = −0.987447E+00 | D = 0.250887E+01 |
| 17TH SURFACE | κ = −10.0000 | A = 0.174112E−01 | B = −0.294974E−01 | C = −0.205541E−01 | D = 0.393615E−02 |
| 18TH SURFACE | κ = 0.0000 | A = −0.219608E−01 | B = −0.496665E−01 | C = 0.000000E+00 | D = 0.000000E+00 |

In the variable focal distance lens system 3, during a change in magnification between the wide-angle end state and the telescopic end state, a change occurs in a surface interval D5 between the first lens group G1 and the second lens group G2, a surface interval D10 between the second lens group G2 and the aperture stop S, a surface interval D16 between the third lens group G3 and the fourth lens group G4, and a surface interval D18 between the fourth lens group G4 and the filter FL. Table 9 presents, as well as the back foci Bf, variable intervals in a wide-angle end state (focal distance f=1.000), an intermediate focal distance state (focal distance f=2.100), and a telescopic end state (focal distance f=9.434) of the respective surface intervals in the numerical value embodiment 3.

TABLE 9

| f | 1.000 | 2.100 | 9.434 |
|---|---|---|---|
| D5 | 0.079 | 1.335 | 4.269 |
| D10 | 2.754 | 1.331 | 0.056 |
| D16 | 0.681 | 1.236 | 3.201 |
| D18 | 1.148 | 1.418 | 0.522 |
| Bf | 0.228 | 0.228 | 0.228 |

Figure 11:
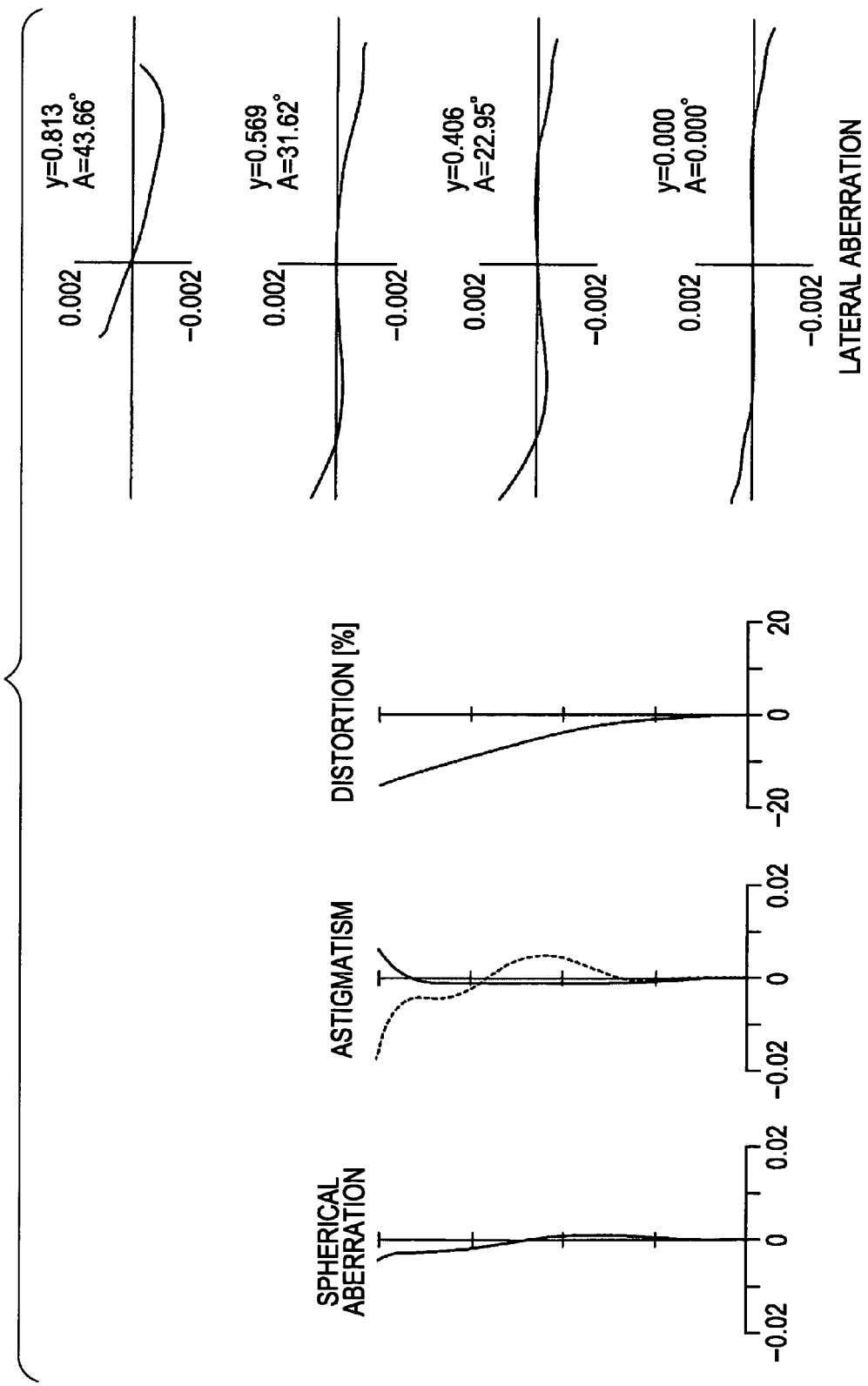
FIG. 11 is a diagram illustrating, together with FIGS. 12 and 13, aberration diagrams of numerical value embodiments obtained by applying specific numerical values to the third embodiment, and illustrating spherical aberration, astigmatism, distortion, and lateral aberration in a wide-angle end state.
Figure 12:
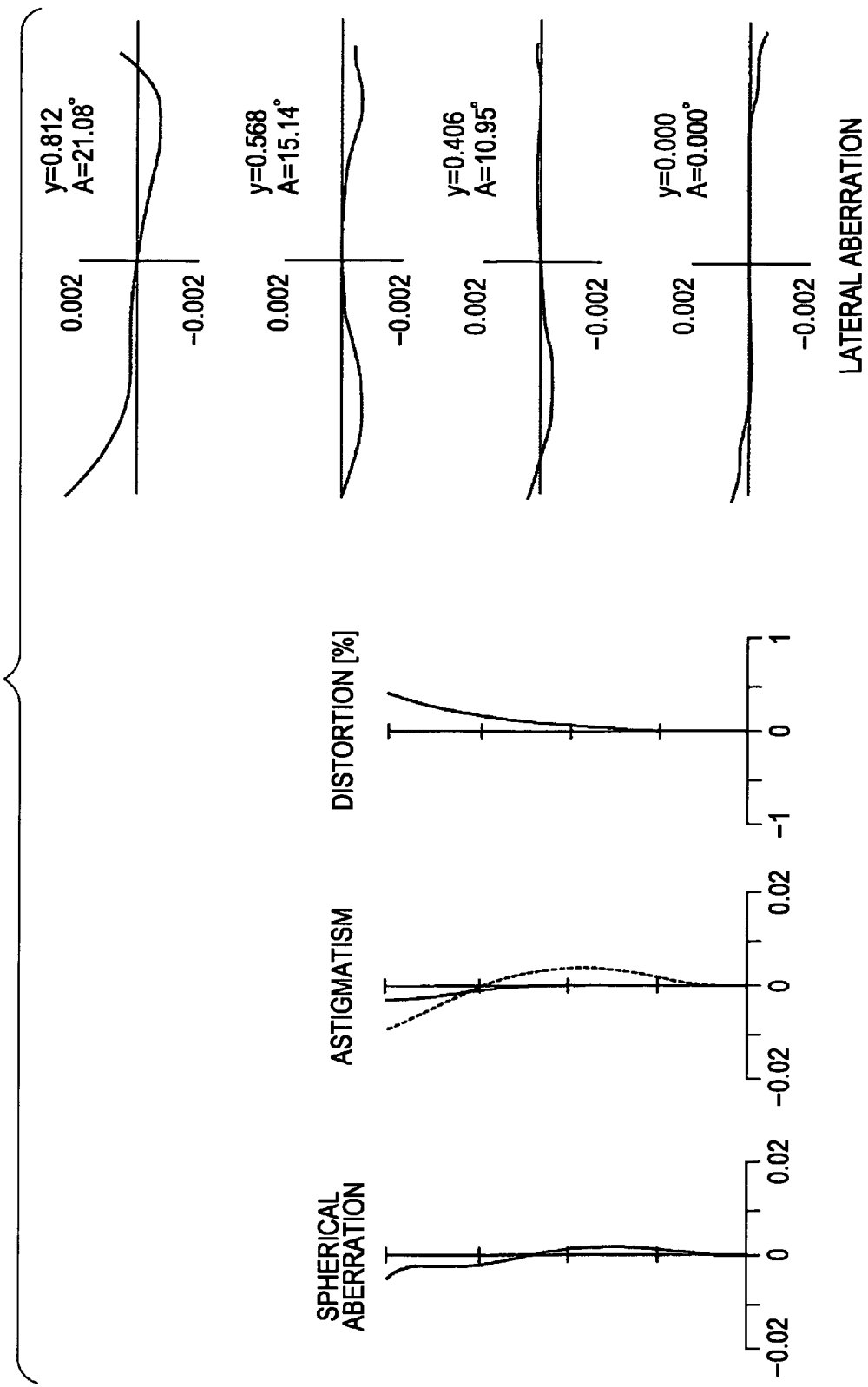
FIG. 12 is a diagram illustrating spherical aberration, astigmatism, distortion, and lateral aberration in an intermediate focal distance state.
Figure 13:
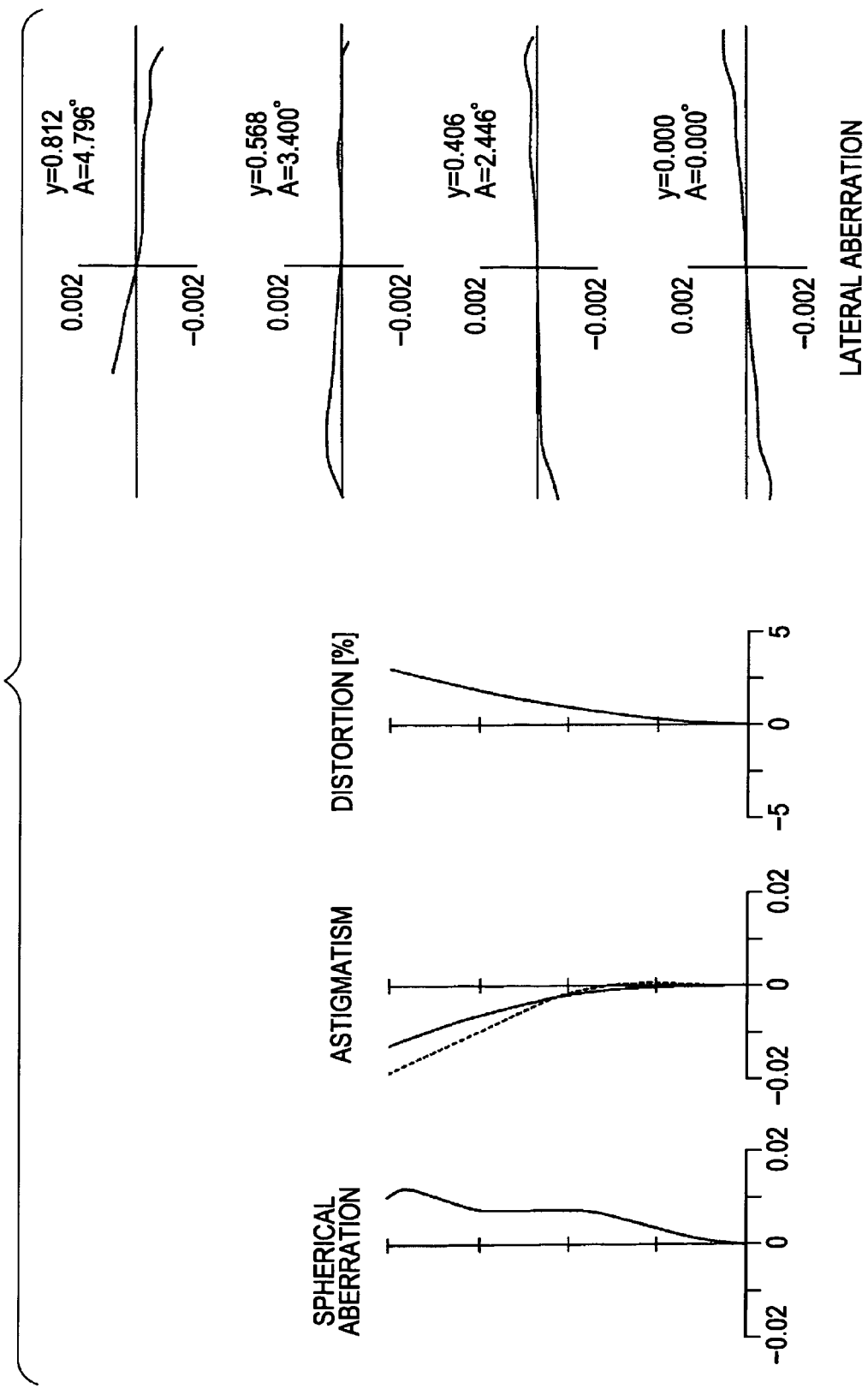
FIG. 13 is a diagram illustrating spherical aberration, astigmatism, distortion, and lateral aberration in a telescopic end state.

In astigmatism diagrams of FIGS. 11 to 13, solid lines indicate values on the sagittal image plane, and broken lines indicate values on the meridional image plane. In lateral aberration diagrams, "y" and "A" represent the image height and the half angle of view, respectively.

It is obvious from the aberration diagrams that the numerical value embodiment 3 favorably corrects aberrations and has excellent imaging performance.

Respective Values of Conditional Expressions: Table 10 presents the respective values of the above-described conditional expressions (1) to (9) in the variable focal distance lens systems 1 to 3.

That is, Table 10 presents R33, R34, and (R33−R34)/(R33+R34) of the conditional expression (1), R22, R23, and (R22−R23)/(R22+R23) of the conditional expression (2), f34w, fw, and f34w/fw of the conditional expression (3), f1, ft, and $f1/(fw \cdot ft)^{1/2}$ of the conditional expression (4), Σ2 and Σ2/fw of the conditional expression (5), D2w and R22/D2w of the conditional expression (6), dS3, R31, and dS3/R31 of the conditional expression (7), f3 and f3/fw of the conditional expression (8), and β2t and 1/β2t of the conditional expression (9).

TABLE 10

| | | VARIABLE FOCAL DISTANCE LENS SYSTEM 1 | VARIABLE FOCAL DISTANCE LENS SYSTEM 2 | VARIABLE FOCAL DISTANCE LENS SYSTEM 3 |
|---|---|---|---|---|
| | R33 | 0.9781 | 1.0150 | 1.0443 |
| | R34 | 3.4011 | 3.4374 | 2.9154 |
| CONDITIONAL EXPRESSION (1) | (R33 − R34)/(R33 + R34) | −0.553 | −0.544 | −0.473 |
| | R22 | 1.0206 | 1.1005 | 1.0756 |
| | R23 | 38.3310 | 22.5561 | 11.2892 |
| CONDITIONAL EXPRESSION (2) | (R22 − R23)/(R22 + R23) | −0.948 | −0.907 | −0.826 |
| | f34w | 1.826 | 1.872 | 1.927 |
| | fw | 1.000 | 1.000 | 1.000 |
| CONDITIONAL EXPRESSION (3) | f34w/fw | 1.826 | 1.872 | 1.927 |
| | f1 | 7.793 | 7.746 | 7.715 |
| | ft | 9.420 | 9.414 | 9.434 |
| CONDITIONAL EXPRESSION (4) | $f1/(fw \cdot ft)^{1/2}$ | 2.539 | 2.525 | 2.512 |
| | Σ2 | 1.148 | 1.157 | 1.210 |
| CONDITIONAL EXPRESSION (5) | Σ2/fw | 1.148 | 1.157 | 1.210 |
| | D2w | 3.467 | 3.576 | 3.784 |
| CONDITIONAL EXPRESSION (6) | R22/D2w | 0.294 | 0.308 | 0.284 |
| | dS3 | 0.090 | 0.079 | 0.079 |
| | R31 | 1.0195 | 1.0684 | 1.1021 |
| CONDITIONAL EXPRESSION (7) | dS3/R31 | 0.088 | 0.074 | 0.072 |
| | f3 | 2.134 | 2.180 | 2.178 |
| CONDITIONAL EXPRESSION (8) | f3/fw | 2.134 | 2.180 | 2.178 |
| | β2t | −1.079 | −1.091 | −1.076 |
| CONDITIONAL EXPRESSION (9) | 1/β2t | −0.927 | −0.917 | −0.929 |

FIGS. 11 to 13 illustrate aberration diagrams in an infinity focusing state in the numerical value embodiment 3. FIG. 11 illustrates aberration diagrams in the wide-angle end state (focal distance f=1.000). FIG. 12 illustrates aberration diagrams in the intermediate focal distance state (focal distance f=2.100). FIG. 13 illustrates aberration diagrams in the telescopic end state (focal distance f=9.434).

As obvious from Table 10, the variable focal distance lens systems 1 to 3 are configured to satisfy the conditional expressions (1) to (9).

Configuration of Imaging Device: Subsequently, an imaging device according to an embodiment of the present invention will be described.

An imaging device according to an embodiment of the present invention is a device including a variable focal distance lens system and an image pickup device which converts an optical image formed by the variable focal distance lens system into an electrical signal.

In the imaging device according to an embodiment of the present invention, the variable focal distance lens system is configured to include a first lens group having positive refractive power, a second lens group having negative refractive power, a third lens group having positive refractive power, and a fourth lens group having positive refractive power, which are sequentially disposed from the object side to the image side.

Further, in the imaging device according to an embodiment of the present invention, the variable focal distance lens system is configured such that, during a change in positional state of lenses from a wide-angle end state to a telescopic end state, the interval between the first and second lens groups is increased, the interval between the second and third lens groups is reduced, the interval between the third and fourth lens groups is changed, and all lens groups are movable.

Further, in the imaging device according to an embodiment of the present invention, the variable focal distance lens system is configured such that the second lens group includes a negative lens having a concave surface facing the image side, and a cemented lens formed by a negative lens having a concave surface facing the image side and a meniscus-shaped positive lens having a convex surface facing the object side, which are sequentially disposed from the object side to the image side.

Further, in the imaging device according to an embodiment of the present invention, the variable focal distance lens system is configured such that the third lens group includes a cemented lens formed by a positive lens having a convex surface facing the object side and a negative lens having a concave surface facing the image side, and a positive lens having two convex surfaces, which are sequentially disposed from the object side to the image side.

In addition, in the imaging device according to an embodiment of the present invention, the variable focal distance lens system is configured such that, in the second lens group, each of two surfaces of the negative lens disposed on the object side and the most image-side surface of the cemented lens is formed into an aspherical surface.

In the imaging device according to an embodiment of the present invention, with the variable focal distance lens system configured as described above, it is possible to achieve a high magnification and a wide angle while ensuring a reduction in size.

In the imaging device according to an embodiment of the present invention, the variable focal distance lens system is configured to satisfy the following conditional expressions (1) and (2): (1) $-0.65 < (R33-R34)/(R33+R34) < -0.25$ and (2) $-1.0 < (R22-R23)/(R22+R23) < -0.6$, wherein R33 represents the radius of curvature of the most image-side surface of the cemented lens of the third lens group, R34 represents the radius of curvature of the object-side surface of the positive lens of the third lens group disposed on the most image side, R22 represents the radius of curvature of the image-side surface of the negative lens of the second lens group disposed on the most object side, and R23 represents the radius of curvature of the most object-side surface of the cemented lens of the second lens group.

In the imaging device according to an embodiment of the present invention, with the variable focal distance lens system satisfying the conditional expression (1), it is possible to favorably correct a negative spherical aberration and a positive curvature of field occurring in the wide-angle end state, and thus to improve the optical performance.

Further, in the imaging device according to an embodiment of the present invention, with the variable focal distance lens system satisfying the conditional expression (2), the occurrence of a coma aberration in a screen peripheral area is suppressed, and mutual eccentricity of the negative lens and the cemented lens occurring in the manufacturing process is reduced. Accordingly, it is possible to improve the optical performance.

Figure 14:
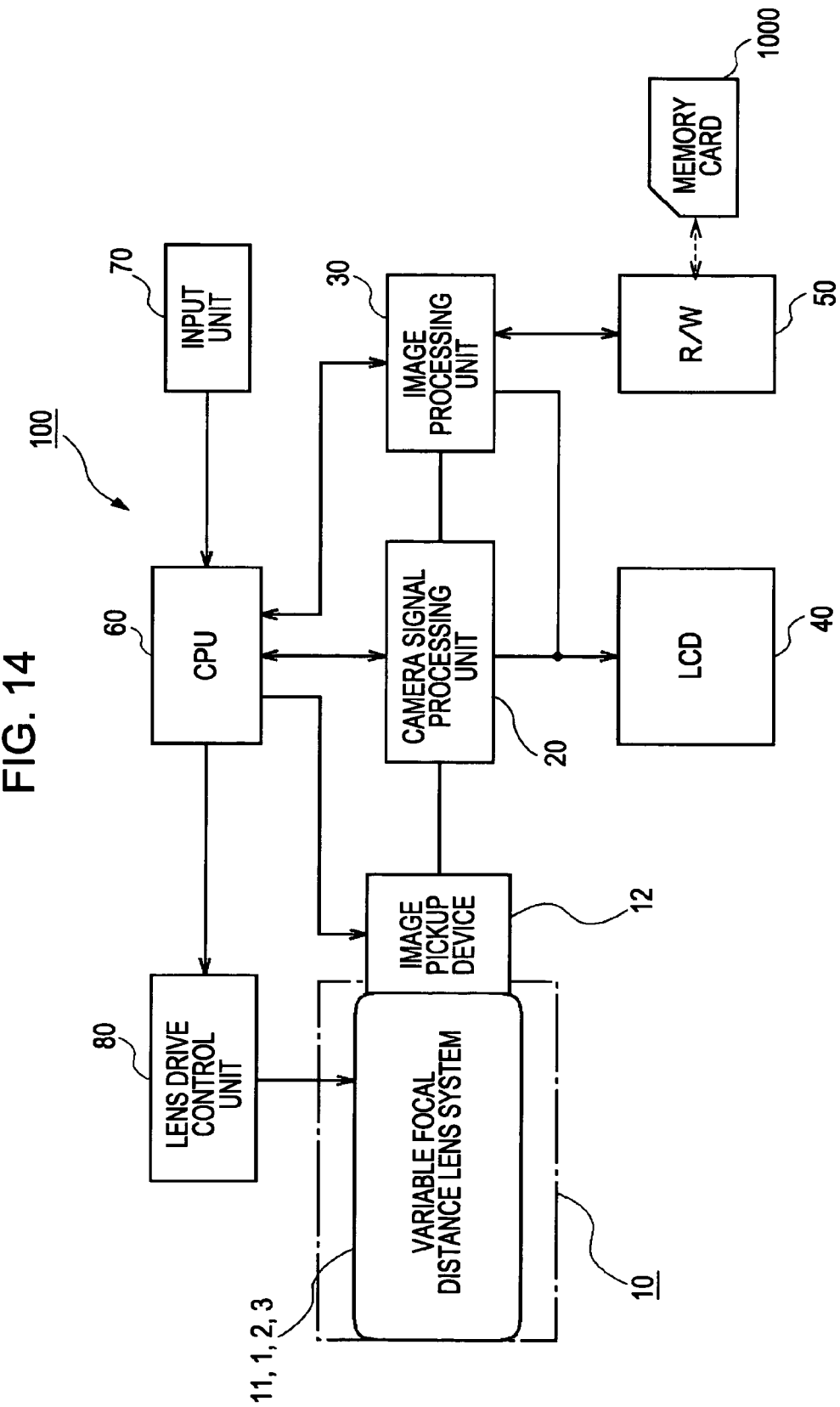
FIG. 14 is a block diagram illustrating an imaging device according to an embodiment of the present invention.

FIG. 14 illustrates a block diagram of a digital still camera according to an embodiment of the imaging device according to an embodiment of the present invention.

An imaging device (digital still camera) 100 includes a camera block 10, a camera signal processing unit 20, an image processing unit 30, an LCD (Liquid Crystal Display) 40, a R/W (Reader/Writer) 50, a CPU (Central Processing Unit) 60, an input unit 70, and a lens drive control unit 80. The camera block 10 performs an imaging function. The camera signal processing unit 20 performs signal processing such as analog-to-digital conversion of a photographed image signal. The image processing unit 30 performs recording and reproduction processing of the image signal. The LCD 40 displays a photographed image and so forth. The R/W 50 writes and reads the image signal in and from a memory card 1000. The CPU 60 controls the entirety of the imaging device 100. The input unit 70 is formed by a variety of switches and so forth operated by a user to perform desired operations. The lens drive control unit 80 controls the driving of lenses provided in the camera block 10.

The camera block 10 is configured to include an optical system including a variable foal distance lens system 11 (the variable focal distance lens system 1, 2, or 3, to which the present invention is applied), an image pickup device 12 such as a CCD (Charge Coupled Device) and a CMOS (Complementary Metal-Oxide Semiconductor), and so forth.

The camera signal processing unit 20 performs a variety of signal processing on a signal output from the image pickup device 12, such as conversion into a digital signal, noise removal, image quality correction, and conversion into a luminance-color difference signal.

The image processing unit 30 performs compression coding and expansion decoding processing of the image signal based on a predetermined image data format, conversion processing of data specifications such as the resolution, and so forth.

The LCD 40 has a function of displaying a variety of data, such as the state of the operation performed on the input unit 70 by the user and the photographed image.

The R/W 50 writes the image data encoded by the image processing unit 30 into the memory card 1000, and reads the image data recorded in the memory card 1000.

The CPU 60 functions as a control processing unit which controls respective circuit blocks provided in the imaging device 100, and controls the respective circuit blocks on the basis of an instruction input signal or the like received from the input unit 70.

The input unit 70 is configured to include, for example, a shutter release button for performing a shutter operation, a selection switch for selecting an operation mode, and so forth, and outputs to the CPU 60 the instruction input signal according to the operation performed by the user.

The lens drive control unit 80 controls a not-illustrated motor and so forth for driving the respective lenses of the variable focal distance lens system 11 on the basis of a control signal received from the CPU 60.

The memory card 1000 is a semiconductor memory attachable to and detachable from, for example, a slot connected to the R/W 50.

Operation of Imaging Device: The operation of the imaging device 100 will be described below.

In a photographing standby state, under the control of the CPU 60, an image signal photographed by the camera block 10 is output to the LCD 40 via the camera signal processing unit 20, and is displayed as a camera-through image. Further, upon input from the input unit 70 of an instruction input signal for zooming, the CPU 60 outputs a control signal to the lens drive control unit 80, and a predetermined lens of the variable focal distance lens system 11 is moved on the basis of the control of the lens drive control unit 80.

Upon operation of a not-illustrated shutter of the camera block 10 in accordance with the instruction input signal received from the input unit 70, the photographed image signal is output from the camera signal processing unit 20 to the image processing unit 30, subjected to compression coding processing, and converted into digital data of a predetermined data format. The converted data is output to the R/W 50 and written into the memory card 1000.

The focusing operation is performed when the lens drive control unit 80 moves a predetermined lens of the variable focal distance lens system 11 on the basis of the control signal received from the CPU 60 upon half-press of the shutter release button of the input unit 70 or full-press of the shutter release button for a recording (photographing) operation, for example.

In the reproduction of the image data recorded in the memory card 1000, the R/W 50 reads predetermined image data from the memory card 1000 in accordance with the operation performed on the input unit 70, and the image processing unit 30 performs expansion decoding processing. Thereafter, a reproduced image signal is output to the LCD 40, and a reproduced image is displayed.

The above-described embodiment presents the example in which the imaging device is applied to the digital still camera. However, the application range of the imaging device is not limited to the digital still camera. Therefore, the imaging device can be widely applied to a camera unit or the like of a digital input-output device such as a digital video camera, a mobile phone with a built-in camera, and a PDA (Personal Digital Assistant) with a built-in camera.

The present application contains subject matter related to that disclosed in Japanese Priority Patent Application JP 2009-046325 filed in the Japan Patent Office on Feb. 27, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A variable focal distance lens system comprising:
   a first lens group having positive refractive power;
   a second lens group having negative refractive power;
   a third lens group having positive refractive power; and
   a fourth lens group having positive refractive power,
   wherein the first to fourth lens groups are sequentially disposed from an object side to an image side,
   wherein, during a change in positional state of lenses from a wide-angle end state to a telescopic end state, the interval between the first and second lens groups is increased, the interval between the second and third lens groups is reduced, and the interval between the third and fourth lens groups is changed,
   wherein, during the change in positional state of the lenses from the wide-angle end state to the telescopic end state, all lens groups are movable,
   wherein the second lens group is configured to include a negative lens having a concave surface facing the image side, and a cemented lens formed by a negative lens having a concave surface facing the image side and a meniscus-shaped positive lens having a convex surface facing the object side, which are sequentially disposed from the object side to the image side,
   wherein the third lens group is configured to include a cemented lens formed by a positive lens having a convex surface facing the object side and a negative lens having a concave surface facing the image side, and a positive lens having two convex surfaces, which are sequentially disposed from the object side to the image side,
   wherein, in the second lens group, each of two surfaces of the negative lens disposed on the object side and the most image-side surface of the cemented lens is formed into an aspherical surface,
   wherein the variable focal distance lens system satisfies the following conditional expressions (1) and (2): (1) $-0.65 < (R33-R34)/(R33+R34) < -0.25$ and (2) $-1.0 < (R22-R23)/(R22+R23) < -0.6$, and
   wherein R33 represents the radius of curvature of the most image-side surface of the cemented lens of the third lens group, R34 represents the radius of curvature of the object-side surface of the positive lens of the third lens group disposed on the most image side, R22 represents the radius of curvature of the image-side surface of the negative lens of the second lens group disposed on the most object side, and R23 represents the radius of curvature of the most object-side surface of the cemented lens of the second lens group.

2. The variable focal distance lens system according to claim 1, satisfying the following conditional expression (3): $1.6 < f34w/fw < 2.1$,
   wherein f34w represents the combined focal distance of the third and fourth lens groups in the wide-angle end state, and fw represents the focal distance of the entire lens system in the wide-angle end state.

3. The variable focal distance lens system according to claim 2,
   wherein the first lens group is configured to include three lenses including a negative lens having a concave surface facing the image side, a first positive lens having a convex surface facing the object side, and a second positive lens having a convex surface facing the object side, which are sequentially disposed from the object side to the image side,
   wherein the variable focal distance lens system satisfies the following conditional expression (4): $2.3 < f1/(fw \cdot ft)^{1/2} < 2.7$, and
   wherein f1 represents the focal distance of the first lens group, and ft represents the focal distance of the entire lens system in the telescopic end state.

4. The variable focal distance lens system according to claim 2, satisfying the following conditional expression (5): $1.0 < \Sigma 2/fw < 1.3$,
   wherein $\Sigma 2$ represents the thickness of the second lens group along the optical axis.

5. The variable focal distance lens system according to claim 2, satisfying the following conditional expression (6): $0.25 < R22/D2w < 0.35$, wherein D2w represents the distance from an aperture stop to the image-side surface of the negative lens of the second lens group disposed on the most object side in the wide-angle end state.

6. The variable focal distance lens system according to claim 5,
wherein the aperture stop is disposed on the object side of the third lens group, and moves integrally with the third lens group during the change in positional state of the lenses,
wherein the variable focal distance lens system satisfies the following conditional expression (7): 0.06<dS3/R31<0.10, and
wherein dS3 represents the distance between the aperture stop and the most object-side surface of the third lens group, and R31 represents the radius of curvature of the most object-side surface of the third lens group.

7. The variable focal distance lens system according to claim 2, satisfying the following conditional expression (8): 2<f3/fw<2.3,
wherein f3 represents the focal distance of the third lens group.

8. The variable focal distance lens system according to claim 2, satisfying the following conditional expression (9): $-1<1/\beta 2t<-0.8$,
wherein $\beta 2t$ represents the lateral magnification of the second lens group in the telescopic end state.

9. The variable focal distance lens system according to claim 1,
wherein the first lens group is configured to include three lenses including a negative lens having a concave surface facing the image side, a first positive lens having a convex surface facing the object side, and a second positive lens having a convex surface facing the object side, which are sequentially disposed from the object side to the image side,
wherein the variable focal distance lens system satisfies the following conditional expression (4): $2.3<f1/(fw\cdot ft)^{1/2}<2.7$, and
wherein f1 represents the focal distance of the first lens group, fw represents the focal distance of the entire lens system in the wide-angle end state, and ft represents the focal distance of the entire lens system in the telescopic end state.

10. The variable focal distance lens system according to claim 1, satisfying the following conditional expression (5): $1.0<\Sigma 2/fw<1.3$,
wherein $\Sigma 2$ represents the thickness of the second lens group along the optical axis, and fw represents the focal distance of the entire lens system in the wide-angle end state.

11. The variable focal distance lens system according to claim 1, satisfying the following conditional expression (6): 0.25<R22/D2w<0.35,
wherein D2w represents the distance from an aperture stop to the image-side surface of the negative lens of the second lens group disposed on the most object-side in the wide-angle end state.

12. The variable focal distance lens system according to claim 11,
wherein the aperture stop is disposed on the object side of the third lens group, and moves integrally with the third lens group during the change in positional state of the lenses,
wherein the variable focal distance lens system satisfies the following conditional expression (7): 0.06<dS3/R31<0.10, and
wherein dS3 represents the distance between the aperture stop and the most object-side surface of the third lens group, and R31 represents the radius of curvature of the most object-side surface of the third lens group.

13. The variable focal distance lens system according to claim 1, satisfying the following conditional expression (8): 2<f3/fw<2.3,
wherein f3 represents the focal distance of the third lens group, and fw represents the focal distance of the entire lens system in the wide-angle end state.

14. The variable focal distance lens system according to claim 1, satisfying the following conditional expression (9): $-1<1/\beta 2t<-0.8$,
wherein $\beta 2t$ represents the lateral magnification of the second lens group in the telescopic end state.

15. An imaging device comprising:
a variable focal distance lens system; and
an image pickup device configured to convert an optical image formed by the variable focal distance lens system into an electrical signal,
wherein the variable focal distance lens system includes
a first lens group having positive refractive power,
a second lens group having negative refractive power,
a third lens group having positive refractive power, and
a fourth lens group having positive refractive power,
wherein the first to fourth lens groups are sequentially disposed from an object side to an image side,
wherein, during a change in positional state of lenses from a wide-angle end state to a telescopic end state, the interval between the first and second lens groups is increased, the interval between the second and third lens groups is reduced, and the interval between the third and fourth lens groups is changed,
wherein, during the change in positional state of the lenses from the wide-angle end state to the telescopic end state, all lens groups are movable,
wherein the second lens group is configured to include a negative lens having a concave surface facing the image side, and a cemented lens formed by a negative lens having a concave surface facing the image side and a meniscus-shaped positive lens having a convex surface facing the object side, which are sequentially disposed from the object side to the image side,
wherein the third lens group is configured to include a cemented lens formed by a positive lens having a convex surface facing the object side and a negative lens having a concave surface facing the image side, and a positive lens having two convex surfaces, which are sequentially disposed from the object side to the image side,
wherein, in the second lens group, each of two surfaces of the negative lens disposed on the object side and the most image-side surface of the cemented lens is formed into an aspherical surface,
wherein the variable focal distance lens system satisfies the following conditional expressions (1) and (2): (1) −0.65<(R33−R34)/(R33+R34)<−0.25 and (2) −1.0< (R22−R23)/(R22+R23)<−0.6, and
wherein R33 represents the radius of curvature of the most image-side surface of the cemented lens of the third lens group, R34 represents the radius of curvature of the object-side surface of the positive lens of the third lens group disposed on the most image side, R22 represents the radius of curvature of the image-side surface of the negative lens of the second lens group disposed on the most object side, and R23 represents the radius of curvature of the most object-side surface of the cemented lens of the second lens group.

* * * * *